US012785132B2

(12) United States Patent
Biondi et al.

(10) Patent No.: US 12,785,132 B2
(45) Date of Patent: Nov. 3, 2026

(54) APPARATUS AND METHOD FOR MAKING A COIL, PREFERABLY FOR AN ELECTROCHEMICAL CELL INTENDED FOR BATTERY PRODUCTION

(71) Applicant: G.D S.P.A., Bologna (IT)

(72) Inventors: Andrea Biondi, Bologna (IT); Enrico Campagnoli, Bologna (IT); Luca Cavazza, Bologna (IT); Fabrizio Nanni, Bologna (IT)

(73) Assignee: G.D S.P.A. (IT)

( * ) Notice: Subject to any disclaimer, the term of this patent is extended or adjusted under 35 U.S.C. 154(b) by 54 days.

(21) Appl. No.: 19/102,046

(22) PCT Filed: Jul. 28, 2023

(86) PCT No.: PCT/IB2023/057691
§ 371 (c)(1),
(2) Date: Feb. 7, 2025

(87) PCT Pub. No.: WO2024/033743
PCT Pub. Date: Feb. 15, 2024

(65) Prior Publication Data

US 2026/0074266 A1 Mar. 12, 2026

(30) Foreign Application Priority Data

Aug. 8, 2022 (IT) ........................ 102022000017001

(51) Int. Cl.
*H01M 10/04* (2006.01)
*B65H 18/08* (2006.01)
(Continued)

(52) U.S. Cl.
CPC ........ *H01M 10/0409* (2013.01); *B65H 18/08* (2013.01); *B65H 20/02* (2013.01); *B65H 23/04* (2013.01); *B65H 2301/443246* (2013.01)

(58) Field of Classification Search
None
See application file for complete search history.

(56) References Cited

U.S. PATENT DOCUMENTS 4,893,765 A 1/1990 Randolph
2025/0042682 A1* 2/2025 Biondi .................. B65H 19/28
(Continued)

FOREIGN PATENT DOCUMENTS

DE 29807844 U1 7/1998
EP 1216943 A2 6/2002

OTHER PUBLICATIONS

International Search and Written Opinion for PCT/IB2023/057691, mailed Nov. 23, 2023.

*Primary Examiner* — William A. Rivera
(74) *Attorney, Agent, or Firm* — Barnes & Thornburg; Steven D. Shipe

(57) ABSTRACT

An apparatus (100) for making a coil (B) comprises a feed unit (2) configured to feed at least one strip-shaped article (N) and a winding unit (1). The winding unit includes a plurality of winding heads (10) and a movement device (3) of said winding heads (10) configured to displace said winding heads (10) along a working path (P). Each winding head (10) is configured to wind said strip-shaped article (N) so as to make said coil (B) and is movable along said working path (P). The feed unit (2) comprises a movable portion (20) configured to be displaced along a substantially horizontal displacement direction (d).

17 Claims, 11 Drawing Sheets

(51) Int. Cl.
*B65H 20/02* (2006.01)
*B65H 23/04* (2006.01)

(56) References Cited

U.S. PATENT DOCUMENTS

| | | | | |
|---|---|---|---|---|
| 2025/0055014 | A1* | 2/2025 | Biondi | H01M 10/0409 |
| 2025/0070214 | A1* | 2/2025 | Biondi | H01M 10/0431 |
| 2025/0100832 | A1* | 3/2025 | Biondi | B65H 19/28 |
| 2025/0158102 | A1* | 5/2025 | Biondi | B21C 47/02 |
| 2025/0266487 | A1* | 8/2025 | Biondi | B65H 19/2223 |
| 2026/0100402 | A1* | 4/2026 | Biondi | H01M 10/0409 |

* cited by examiner

APPARATUS AND METHOD FOR MAKING A COIL, PREFERABLY FOR AN ELECTROCHEMICAL CELL INTENDED FOR BATTERY PRODUCTION

This application is a 371 National Stage Application from International Application No. PCT/IB2023/057691, filed Jul. 28, 2023, which claims the benefit of priority of Italian Application No. 102022000017001, filed Aug. 8, 2022, the entirety of both of which applications are incorporated herein by reference.

The present invention relates to an apparatus for making a coil, for example of the type formed by winding a strip-shaped article which includes a strip or a plurality of overlapped strips.

The invention is also directed to a method for making the same coil.

The present invention finds a preferred, although not exclusive, application in the sector of the production of electrochemical cells, for the realization of which a winding of a strip-shaped article is used.

In particular, in the pertinent technical sector, it is known to combine conductor strips and separator strips into layers in order to form an anode and cathode structure. The article made by overlapped the aforesaid layers is then wound in the form of a coil and used for making the electrochemical cell itself.

An example of apparatus and method for making batteries by winding conductor strips and separator strips is described in WO2010023525A1.

In this description as well as in the claims appended thereto, certain terms and expressions are deemed to have, unless otherwise expressly indicated, the meaning expressed in the following definitions.

The term "strip-shaped article" is intended to mean any solid product which, within an industrial production line, is presented in the form of an elongated strip or ribbon, i.e. an element in which the longitudinal extension is significantly greater than its transversal extension. The strip-shaped article can be formed by a single strip or ribbon of material, or by overlapped several strips arranged in layers.

The strip-shaped article also has characteristics such that a certain bending during its advancement along a relative production line is allowed.

The strip-shaped article can for example be made by overlapped alternating conductor and insulating layers between them and be intended to form a sandwich to be wound for making a coil intended for the production of electrochemical cells.

The term "winding" is intended to mean making a spiral structure by rotation of a strip, a ribbon or more generally a strip-shaped article around an axis, a flat surface or another structure. By winding, the strip-shaped article will form one or more turns around the axis or the structure.

The term "coil" is intended to mean any spiral structure formed by winding a strip, ribbon or more generally a strip-shaped article around an axis, a flat surface or another winding structure. Depending on the structure around which the strip-shaped article is wound, the overall shape of the coil may be substantially cylindrical rather than flattened or otherwise shaped.

As mentioned above, the coil can find application not only in the electrochemical cell sector but also in other sectors, such as for example in the sector of the capacitors, inside which coil-shaped structures can be likewise used.

The term "closed path" is intended to mean a path along which a winding head or other element travels in which the starting point and the end point of the path substantially coincide.

The term "continuous" refers to an expression of motion, is intended to mean an operation that takes place seamlessly, without there being a stop or an interruption in the operation in question. In particular, with reference to the movement of a strip or of other element, the term "continuous" indicates that the strip, or a portion thereof, is never stopped during its movement.

By the term "substantially constant" referred to a measure or quantity, such as for example the displacement speed of an object, it is meant that such measure or quantity maintains, over time, a value which preferably varies by a maximum of ±10%, preferably by a maximum of ±5%, preferably by a maximum of ±2%.

By the term "integral" referred to the movement of two or more elements, it is meant that these elements perform substantially the same movement and substantially simultaneously. In other words, two integral elements move together, as a single body, although they are not necessarily joined or constrained to each other. It can in fact be provided that the respective movement systems of the two elements are coordinated in such a way as to move, when necessary, the two elements together. Furthermore, it may be provided for the use of a temporary constraint between the two elements which, for example, joins them to each other in some steps, causing them to move together, and separates them again, making them movable independently of each other.

It should also be specified that by the expression "to displace an object between a first position and a second position" it is intended to mean both the displacement from the first position to the second position and the displacement from the second position to the first position.

This definition applies in much the same way to similar expressions of motion, such as for example to transfer or to move a generic object between two positions or between two zones or even between two different operating configurations.

In this context, by the term "kinematically independent" is intended to mean two or more systems that have the possibility of performing movements in a completely autonomous and distinct manner. In other words, kinematically independent systems or devices are configured in such a way that they can perform their intended movements without them modifying the position of other systems concerned. It is also significant to understand that this condition of kinematic independence does not prevent the different systems or devices from being able to collaborate and/or transfer material to each other along common and substantially overlapped segments of space.

It is further important to note that this condition of kinematic independence does not exclude that different and mutually directly independent parts have a common drive origin. In this sense, therefore, mutually kinematically independent systems could be moved, for example, by means of the same drive shaft through different types of drive connections, in any case implementing own motions that do not directly influence one another.

The term "pin" will indicate below a mechanical connection element, with an elongated development or in any case configured in such a way as to define a respective axis around which it can rotate. In the context of the present invention, this element can have a cross-section of any shape, for example semicircular, circular, triangular, or even such that the overall shape of the pin is flat.

The Applicant, in the context of the constant need to increase the performance and the efficiency of the production processes, has preliminarily observed how, in a production line for making a coil, the advancement speed of the strip-shaped article with respect to the unit that carries out the winding thereof can constitute an important element of limitation of the production capacity of the line itself.

Furthermore, this limitation is even more critical in the case where high precision is required in the formation of the coil. In particular, the Applicant has observed that in many applications, such as for example in the sector of the production of electrochemical cells, high precision in the geometry of the windings must be ensured in order to ensure the required performance to the finished product.

The Applicant has therefore further perceived that in the case where the strip-shaped article is formed by several strips, for example combined into a multilayer structure, it is possible to control the conditions of the strip-shaped article by acting on the individual layers.

Finally, the Applicant has found out how it is possible to increase the winding speed of the strip-shaped article with respect to the known solutions if the movement of the strip is not interrupted during the different steps of making the coil.

The Applicant has in fact noted that these steps of interruption and resumption of the advancement of the strip-shaped article produce undesired reductions in the production efficiency of the process together with increased wear of the movable parts that are submitted to greater accelerations and decelerations in order to try to compensate for these negative variations in productivity.

The Applicant has also observed that movements with vector components and parallel to the vertical direction are potentially complex and unfavourable in their punctual control since they are affected by further accelerations and decelerations due to contributions of gravitational origin.

In this sense, the Applicant has also observed that the gravitational forces applied following such movements become increasingly significantly critical as the weight of the moving parts increases. The Applicant has therefore noted that this aspect, therefore, also entails a further limitation in the freedom to design the movable parts and the functionalities carried out by them.

Furthermore, the Applicant has observed that in some cases of undesired malfunction of the apparatus and/or unpredictable lack of feed to the system, some parts risk not being fully controlled anymore and being able to displace themselves in an undesired and potentially dangerous manner according to the action of the acting force of gravity.

The Applicant has also observed that an unexpected stop of the apparatus can be further critical in the case where the movable parts remain blocked in positions that cannot be easily reached by the operator, for example because they are excessively high. Similar criticalities can additionally occur during normal maintenance of the apparatuses.

Still furthermore, the Applicant has observed that, with respect to these new problems observed, some processing steps are more relevant than others and that they could be advantageously modified without significantly compromising the process timings and therefore the yield of the implemented apparatus.

In order to maintain a high speed for making a coil by means of a strip-shaped article allowing to proceed with a continuous process and minimizing any wear, the Applicant has therefore perceived that this can be achieved by guaranteeing a continuity of motion according to the preferred directions.

The Applicant has therefore further perceived how it is possible to increase the production efficiency of electrochemical batteries by winding strips with respect to known solutions if these operations are carried out continuously according to displacements of specific movable parts that are affected to a lesser extent by the effect of the force of gravity during their operating steps.

The Applicant has also perceived that the provision of said preferred directions can also contribute to improving the ergonomics of the apparatus, allowing to limit the need for the operators to have access to parts that are difficult to reach.

Finally, the Applicant has found that by setting in motion a movable portion used for coupling while the strip is being wound, it is possible to optimize the operations of coupling the strips and of winding the coil without interrupting the process and without compromising the dimensional precision of the coil.

The Applicant has further found out how it is possible to limit undesired contributions of gravitational forces on the movable parts by providing specific displacements directions for that movable portion.

Thanks to these characteristics, the strip can advance even during the coupling and winding step, allowing a high process yield, a continuous advancement of the processing operations and a minimisation of the wear induced on predetermined movable parts.

In a first aspect thereof, therefore, the present invention is directed to an apparatus for making a coil, preferably for an electrochemical cell intended for battery production.

Preferably, the apparatus comprises a feed unit configured to feed at least one strip, and preferably a plurality of strips, which is/are suitable for making at least one strip-shaped article.

Preferably, the plurality of strips comprises at least one conductor strip and/or a separator strip.

Preferably, the apparatus comprises a winding unit which includes at least one winding head.

Preferably, the at least one winding head is configured to wind the strip-shaped article so as to make the coil.

Preferably, the feed unit comprises a movable portion.

Preferably, the movable portion comprises a movable inlet section from which the strip or the plurality of strips enters.

Preferably, the movable portion comprises a movable outlet section, from which the strip-shaped article exits.

Preferably, the movable portion comprises a coupling roller of the plurality of strips by means of which the strip-shaped article is made and preferably placed upstream with respect to the movable outlet section.

Preferably, the movable portion is configured to be displaced along a substantially horizontal displacement direction.

By the term "movable" reference is made to portions or devices provided with the ability to be displaced in space. It is important to note that these portions or devices can be movable both because they are provided with their own displacement means, and because they are constrained to further portions configured with displacement capacity.

The term "substantially horizontal" is intended to mean that a displacement direction remains constant with a possible angular variation with respect to the horizon comprised between ±15°, more preferably comprised between ±10°, more preferably comprised between ±5° and even more preferably equal to 0° with respect to the horizon.

Furthermore, the term "substantially horizontal" is intended to mean that a displacement direction comprises a horizontal segment equal to at least 60% of its totality of displacement, more preferably equal to 80% of its totality of displacement and even more preferably equal to 100% of its totality of displacement. In other words, the terms "substantially horizontal" also comprise, for example, laws of motion that provide for a first horizontal segment, a second short vertical segment with change of altitude, a third horizontal segment equal to and opposite to the first horizontal segment and a fourth vertical segment equal to and opposite to the second vertical segment in such a way as to return to the initial position prior to the first horizontal segment.

The terms "upstream" and "downstream" indicate operating steps that have their specific position in the sequentiality of a process.

In more detail, if the operation B occurs upstream of the operation A, it means that such an operation B will occur sequentially before said operation A.

Similarly, if the operation B occurs downstream of the operation A, it means that such an operation B will occur sequentially after said operation A.

These considerations set forth for operating steps also apply to devices and/or portions that are positioned respectively upstream or downstream of others according to the operational sequential flow of the process considered and described.

Thanks to these characteristics, it is possible to produce the strip-shaped article according to a continuous process, in particular during the realization of the coil, minimizing the impact of the force of gravity that one would have by travelling along mainly vertical trajectories of accelerated or decelerated motion, with a decrease in the loads to which the movable and drive parts are submit, reducing wear.

In this way, both the productivity of the apparatus, in terms of coils wound per unit of time, and the average life of the apparatus in terms of useful life can be increased.

Furthermore, a substantially horizontal displacement direction allows an overall improvement of the ergonomics of the apparatus. In fact, the provision of a horizontal displacement allows to reduce the risk that the movable portion stops in positions not easily reachable by the operator as they are too high and, in general, to reduce the need for the operators to have to reach zones at a too high height during the step of maintenance and tuning of the apparatus.

Based on a second aspect thereof, the present invention concerns a method for making a coil, preferably for an electrochemical cell intended for battery production, said coil being made by winding at least one strip-shaped article.

Preferably, the method comprises arranging a feed unit comprising a movable portion to feed at least one strip and, preferably, a plurality of strips to a coupling roller by means of which said strip-shaped article is made.

Preferably, the method comprises providing at least one winding head.

Preferably, the method comprises winding the strip-shaped article exiting from the coupling roller by the at least one winding head.

Preferably, the method comprises moving the movable portion along a substantially horizontal displacement direction.

Also on the basis of this aspect it is possible to achieve the same advantages described in relation to the previous aspect.

The Applicant has also noted that by using more than one winding head it is possible to work simultaneously on two distinct coils and/or to have one of the winding heads perform reset actions, while the other carries out the processing.

The Applicant has therefore further perceived how it is possible to increase the winding speed of the strip-shaped article with respect to the known solutions if the movement of the strip is not interrupted during the formation of the coil.

The Applicant has finally found out that by setting the winding head in motion while the strip-shaped article is being wound it is possible to speed up the winding operations without compromising the dimensional precision of the coil, nor creating undesired states of tension on the strip.

Thanks to these characteristics, the strip-shaped article can also advance during the winding step, at the same time allowing to increase the winding speed of the strip and not making the stop thereof during this operation necessary.

In a third aspect thereof, therefore, the present invention is directed to an apparatus for making a coil, preferably for an electrochemical cell intended for battery production.

Preferably said apparatus comprises a feed unit configured to feed at least one strip-shaped article, preferably comprising one or more strips which include conductor strips and/or separator strips.

Preferably said apparatus comprises a winding unit.

Said winding unit preferably includes a plurality of winding heads.

Preferably, the winding unit comprises a movement device of said winding heads configured to displace said winding heads along a working path.

Preferably each winding head is configured to wind said strip-shaped article so as to make said coil.

Preferably said winding head is movable along said working path so that said at least one strip-shaped article is submitted to a substantially constant tension during the winding of said strip-shaped article by means of a respective winding head and as a consequence of the movement of said winding head and preferably at least in a segment comprised between said feed unit and said winding head.

The term "substantially constant tension" is intended to mean that the tension remains constant with a variation comprised between ±15%, more preferably comprised between ±10%, more preferably comprised between ±5% during the operating steps of the apparatus. Furthermore, in the context of the present invention, the constant tension state can preferably be manifested in a constant speed of the strip-shaped article during the feeding and winding steps of the strip.

Thanks to these characteristics it is possible to submit the strip-shaped article to a substantially constant tension, in particular during the realization of the coil, thanks to the fact that the winding takes place while the winding head is being displaced.

In this way, both the productivity of the apparatus can be increased, in terms of coils wound per unit of time, and the characteristics of the winding can be improved, which can be done in a more precise and regular manner.

Based on a fourth aspect thereof, the present invention concerns a method for making a coil, preferably for an electrochemical cell intended for battery production, said coil being made by winding at least one strip-shaped article.

Said method preferably comprises providing a plurality of winding heads movable along a working path.

Preferably, the method envisages winding said strip-shaped article by a winding head of said plurality.

Preferably the method comprises moving said winding head by means of which said strip-shaped article is wound such that said strip-shaped article is submitted to a substantially constant tension. Also on the basis of this aspect it is possible to achieve the same advantages described in relation to the previous aspect.

In a fifth aspect thereof, the present invention concerns an apparatus for making a coil, preferably for an electrochemical cell intended for battery production.

Preferably said apparatus comprises a feed unit configured to feed at least one strip-shaped article, preferably including one or more strips comprising conductor strips and/or separator strips, by displacing said strip-shaped article along a feed direction.

The apparatus preferably comprises a winding unit.

Preferably the winding unit includes a plurality of winding heads.

Preferably, the winding unit includes a movement device of said winding heads which is configured to displace said winding heads along a working path.

Preferably, each winding head supports a gripping device that is configured to grasp a portion of said strip and is configured to wind said strip so as to make said coil.

Preferably, said movement device is further configured in such a way as to displace a respective winding head, when it is grasping said portion of strip-shaped article, along an operative segment of said working path in a direction discordant with respect to said feed direction.

Thanks to these characteristics, it is possible to reduce the length of the strip-shaped article, or in any case to keep it minimal, during the winding of the strip. In this way, the situations that can cause undesired states of tension on the strip are limited and it is generally possible to perform high winding speeds.

In a sixth aspect thereof, the present invention concerns a method for making a coil, preferably for an electrochemical cell intended for battery production, said coil being made by winding at least one strip-shaped article.

The method preferably comprises providing a plurality of winding heads movable along a working path.

Preferably, it is envisaged moving said strip-shaped article in a feed direction so as to feed said strip-shaped article to one of said winding heads.

Preferably the method includes grasping a portion of said strip-shaped article by means of a gripping device of said winding head.

Preferably the method comprises displacing said winding head, while it is grasping said portion of strip-shaped article, in a direction discordant with respect to said feed direction, along an operative segment of said working path.

Also on the basis of this aspect it is possible to achieve the same advantages described in relation to the previous aspect.

In a seventh aspect thereof, the present invention concerns an apparatus for making a coil, preferably for an electrochemical cell intended for battery production.

Preferably said apparatus comprises a feed unit configured to feed at least one strip-shaped article, which includes at least one strip, preferably a plurality of strips including conductor strips and/or separator strips.

The apparatus preferably includes a winding unit.

Preferably, the winding unit includes a plurality of winding heads, each winding head being configured to wind said strip-shaped article around a respective winding axis so as to make said coil.

Furthermore, the winding unit preferably comprises a movement device of said winding heads configured to displace said winding heads along a working path.

Preferably, the winding heads are displaced according to a trajectory which includes at least one rotation about a rotation axis of said movement device, said rotation axis being different from said winding axis, and preferably a translation and/or a rotation about a further axis, different from said rotation axis and from said winding axis.

Thanks to these characteristics, it is possible to perform, by means of special kinematic mechanisms, a cyclic movement of the rotation heads, which can be obtained by rotation about the rotation axis of the movement device, with further movements of the heads performed by a translation and/or by further rotation movements.

In this way, it is possible to obtain, with a constructively simple solution and, as such, able to be able to perform high speeds, the trajectories necessary for the winding heads, in order to carry out the winding of the strip during the movement of the head itself, without this entailing undesired states of tension or movements that are difficult to control for the strip.

It will be appreciated that the trajectory travelled by the winding head may include rotation and translation/rotation in sequence or a combined rototranslation movement which includes such rotations/translation.

In an eighth aspect thereof, the present invention concerns a method for making a coil, preferably for an electrochemical cell intended for battery production, said coil being made by winding at least one strip-shaped article.

Said method preferably comprises providing a plurality of winding heads.

Preferably, it is envisaged winding said strip-shaped article around a winding axis by means of one of said winding heads.

Preferably the method comprises moving said winding heads according to a trajectory formed by at least one rotation about a rotation axis of said movement device, said rotation axis being different from said winding axis and preferably a translation and/or a rotation about a further axis, different from said rotation axis and from said winding axis.

Also on the basis of this aspect it is possible to achieve the same advantages described in relation to the previous aspect.

In a ninth aspect thereof, the present invention concerns an apparatus for making a coil, preferably for an electrochemical cell intended for battery production.

Preferably said apparatus comprises a feed unit configured to feed at least one strip-shaped article, preferably comprising one or more strips which include conductor strips and/or separator strips. Preferably said feed unit comprises a movable portion which includes an outlet section through which said strip-shaped article passes when it exits said feed unit.

The apparatus also preferably comprises a winding unit configured to receive said strip-shaped article from said outlet section.

The winding unit preferably includes a plurality of winding heads.

Preferably the winding unit includes a movement device said winding heads.

Preferably each winding head is configured to wind said strip-shaped article so as to make said coil.

Said winding heads and said movable portion are preferably both movable.

Preferably said movement device is configured to move said winding heads along a working path in such a way as to keep a respective winding head, on which said strip-shaped article is wound, at a predetermined distance from said movable portion while said winding head is moving.

Thanks to these characteristics, it is possible to control, in the various steps of making the coil, the distance between the feed unit and the winding head, providing for the appropriate distance in order to carry out the winding, minimizing the undesired states of tension and allowing, when necessary, the cutting of the strip-shaped article.

In a tenth aspect thereof, the present invention concerns a method for making a coil, preferably for an electrochemical cell intended for battery production, said coil being made by winding at least one strip-shaped article.

Said method preferably comprises providing a plurality of winding heads movable along a working path.

Preferably the method envisages feeding said strip-shaped article to one of said winding heads through an outlet section of a feed unit.

Preferably, the method comprises winding said strip-shaped article by means of said winding head to which said strip-shaped article is fed.

Preferably, it is envisaged moving simultaneously said outlet section and said winding head to which said strip-shaped article is fed, keeping them at a predetermined distance.

Also on the basis of this aspect it is possible to achieve the same advantages described in relation to the previous aspect.

In an eleventh aspect thereof, the present invention concerns an apparatus for making a coil, preferably for an electrochemical cell intended for battery production.

Preferably said apparatus comprises a feed unit configured to feed at least one strip-shaped article, preferably including one or more strips which include conductor strips and/or separator strips;

Preferably said apparatus comprises a winding unit.

The winding unit preferably includes a plurality of winding heads, each winding head being preferably configured to wind said strip-shaped article so as to make said coil.

Preferably, the winding unit may comprise a movement device of said winding heads configured to displace said winding heads along a working path.

Preferably said plurality of winding heads comprises at least a first winding head and a second winding head.

Said movement device is preferably configured in such a way as to vary a distance between said first winding head and said second winding head along said working path.

Thanks to these characteristics and, in particular, to the possibility of varying the distance between the two winding heads, it is possible to efficiently manage the steps of making the coil, in particular by varying the distance between the two heads between the steps in which the winding takes place and those in which the strip-shaped article is cut.

In a twelfth aspect thereof, the present invention concerns a method for making a coil, preferably for an electrochemical cell intended for battery production, said coil being made by winding at least one strip-shaped article.

Preferably said method comprises providing a plurality of winding heads movable along a working path.

Preferably said plurality of winding heads comprises at least a first winding head and a second winding head.

The method preferably comprises winding said strip-shaped article by means of said first winding head and/or said second winding head.

It is also preferably envisaged to vary a distance between said first winding head and said second winding head along said working path.

Also on the basis of this aspect it is possible to achieve the same advantages described in relation to the previous aspect.

In a thirteenth aspect thereof, the present invention concerns an apparatus for making a coil, preferably for an electrochemical cell intended for battery production. The apparatus preferably comprises a feed unit configured to feed a strip-shaped article which preferably includes at least one or more strips which preferably include conductor strips and/or separator strips.

Preferably the apparatus further comprises a winding unit which preferably includes a plurality of winding heads.

Preferably the apparatus comprises a movement device of said winding heads preferably configured to displace said winding heads along a working path.

Each winding head is preferably configured to wind said strip so as to make said coil during a displacement, made by means of said movement device, of said winding head along an operative segment of said working path.

Thanks to these characteristics, the apparatus for making a coil can carry out the winding of the strip-shaped article with no need to interrupt feeding the same as the winding head can move while the strip-shaped article is being wound.

In this way, on the one hand, the strip-shaped article can operate at higher speeds than known solutions, while guaranteeing at the same time the required quality in the structure of the coil, thanks to the possibility of controlling the tension acting on the strip-shaped article by acting on the winding speed and on the displacement of the winding heads.

In a fourteenth aspect thereof, the present invention concerns a method for making a coil, preferably for an electrochemical cell intended for battery production, said coil being made by winding a strip-shaped article.

The method preferably comprises providing a plurality of winding heads movable along a working path.

Further, the method preferably includes winding said strip-shaped article by means of said winding head during a displacement of said winding head along an operative segment of said working path. Also the method according to this aspect allows the coils to be made at a higher speed and without interruptions in the path of the strip-shaped article, thanks to the possibility of carrying out the winding while the winding head itself is travelling along a working path and, in particular, a specific segment thereof. The displacement of the winding head can in fact be coordinated with the feeding of the strip-shaped article to the winding heads so that it is not necessary to interrupt the advancement of the strip-shaped article, or of the relative strips that possibly form it, during the process of making the coil.

In a fifteenth aspect thereof, the present invention concerns an apparatus for making a coil, preferably for an electrochemical cell intended for battery production.

Preferably said apparatus comprises a feed unit configured to feed at least one strip-shaped article preferably formed by means of a plurality of strips preferably including conductor strips and/or separator strips.

The apparatus preferably comprises a winding unit.

Said winding unit preferably includes a plurality of winding heads.

Preferably, the winding unit includes a movement device of said winding heads which is configured to displace said winding heads along a working path.

Preferably each winding head is configured to wind said strip-shaped article so as to make said coil.

Preferably at least one of said strips is fed continuously to said winding head by said feed unit.

Thanks to these characteristics, it is possible to make the coil without interrupting feeding the strip, thus avoiding interruptions in the movement of the strips that might generate unwanted states of tension or in any case decrease the productivity of the apparatus, always for the benefit of the productivity and of the quality of the product made.

In a sixteenth aspect thereof, the present invention concerns a method for making a coil, preferably for an electrochemical cell intended for battery production, said coil being made by winding at least one strip-shaped article.

Preferably said method comprises combining a plurality of layers, preferably including conductor strips and/or separator strips, so as to form said strip-shaped article.

Preferably at least one of said strips is fed continuously;

The method preferably comprises providing a plurality of winding heads movable along a working path.

Preferably, it is envisaged winding said strip-shaped article by means of said winding head.

Also on the basis of this aspect it is possible to achieve the same advantages described in relation to the previous aspect.

In a seventeenth aspect thereof, the present invention concerns an apparatus for making a coil, preferably for an electrochemical cell intended for battery production.

Preferably said apparatus comprises a feed unit configured to feed at least one strip-shaped article, preferably comprising one or more strips which include conductor strips and/or separator strips. Said feed unit preferably comprises an outlet section through which said strip-shaped article is fed to said winding unit and, preferably, an inlet section.

Said inlet section is preferably adapted to receive said at least one strip from a respective dispensing device.

The apparatus preferably comprises a winding unit.

Said winding unit preferably includes a plurality of winding heads, each winding head of said plurality being configured to wind said strip-shaped article so as to form said coil.

Preferably said winding unit comprises a movement device of said winding heads configured to displace said winding heads along a working path.

The apparatus preferably comprises an accumulation device configured in such a way as to accumulate a variable quantity of said at least one strip-shaped article preferably between said inlet section and said outlet section.

Preferably the apparatus comprises an actuation device of the accumulation device which actuates, preferably by displacing it, the accumulation device to vary the accumulated quantity of strip.

Thanks to these characteristics, it is possible to envisage steps in which, while continuing to make at least one of the strips advance, this is not supplied, and in particular wound, to the winding heads. In this way, the cutting steps can be managed at best and/or it is possible to provide for strips of different lengths in the case of a strip-shaped article formed by a plurality of overlapped layers.

It is also possible to accumulate simultaneously all the strips forming the strip-shaped article, for example when the movement device, and hence the movable portion, move along the operative segment, and to quickly wind the strip thus accumulated and/or take advantage of the accumulated quantity of strip to adjust the tension of the strip optimally.

In an eighteenth aspect thereof, the present invention concerns a method for making a coil, preferably for an electrochemical cell intended for battery production, said coil being made by winding at least a strip-shaped article.

Preferably said method comprises providing a plurality of winding heads movable along a working path.

The method preferably envisages winding said strip-shaped article by means of said winding head. Preferably, the method comprises accumulating a variable quantity of said at least one strip-shaped article in an upstream position with respect to said winding head on which said strip-shaped article is wound, said accumulated quantity being preferably variable during the displacement of said winding heads.

Also on the basis of this aspect it is possible to achieve the same advantages described in relation to the previous aspect.

In a nineteenth aspect thereof, the present invention concerns an apparatus for making a coil, preferably for an electrochemical cell intended for battery production.

Preferably said apparatus comprises a feed unit configured to feed at least one strip-shaped article, preferably comprising one or more strips which include conductor strips and/or separator strips. Preferably said apparatus comprises a winding unit which includes a plurality of winding heads. Preferably, each winding head supports a gripping device that is configured to grasp a portion of said strip-shaped article.

The winding unit preferably comprises a movement device of said winding heads configured to displace said winding heads along a working path.

Preferably each winding head is configured to wind said strip-shaped article so as to make said coil.

Preferably each gripping device comprises a pair of pins configured to hold said strip-shaped article between them.

Preferably at least one of said pins being movable so as to join the other pin holding said strip-shaped article between them.

Thanks to these characteristics, it is possible to grasp and block the strip-shaped article, in such a way as to carry out the winding, in a simple way and as part of a continuous and automated process. In a twentieth aspect thereof, the present invention concerns a method for making a coil, preferably for an electrochemical cell intended for battery production, said coil being made by winding at least one strip-shaped article.

Preferably said method comprises providing a plurality of winding heads movable along a working path.

The method preferably comprises grasping a portion of said strip-shaped article by means of said winding head.

Preferably, it is envisaged winding said strip-shaped article by means of said winding head.

Preferably grasping said portion of strip-shaped article comprises arranging said portion between a pair of pins, at least one of said pins being movable so as to join the other pin holding said strip-shaped article between them.

Also on the basis of this aspect it is possible to achieve the same advantages described in relation to the previous aspect.

Based on a twenty-first aspect thereof, the present invention also refers to an apparatus for making a coil, preferably for an electrochemical cell intended for battery production.

Said apparatus preferably comprises a feed unit configured to feed at least one strip-shaped article formed by means of a plurality of strips preferably including conductor strips and/or separator strips.

Preferably said feed unit comprises a movable portion.

Preferably respective feed paths are defined for each of said strips.

Said feed paths preferably comprise a respective accumulation segment, said accumulation segments being substantially parallel to each other.

Preferably, the apparatus comprises a winding unit which includes at least one winding head configured to wind said strip-shaped article so as to make said coil.

Preferably said feed unit is configured in such a way as to vary, through movement of said movable portion, a respective longitudinal extension of each of said accumulation segments. Said longitudinal extension of said accumulation segments is varied simultaneously, preferably by a same quantity, and preferably keeping said accumulation segments substantially parallel to each other.

Thanks to these features it is possible to use the displacement of the movable portion to accumulate simultaneously the same quantity of strip for each of the strips forming the strip-shaped article. In this way it is possible to use a continuous feeding of the strips while nonetheless providing for steps in which the strip-shaped article is not wound.

Based on a twenty-second aspect, the present invention also refers to a method for making a coil, preferably for an electrochemical cell intended for battery production. Preferably said coil is made by winding at least one strip-shaped article.

Said method preferably comprises making a plurality of strips advance along a respective feed path, said plurality of strips preferably including conductor strips and/or separator strips.

Preferably, it is envisaged combining said strips into layers, at the end of said feed path, in such a way as to form said strip-shaped article.

The method preferably comprises providing at least one winding head and preferably winding said strip-shaped article by means of said winding head.

Preferably each of said respective feed paths comprises a respective accumulation segment having a variable length, said accumulation segments being preferably substantially parallel to each other. Preferably said method comprises simultaneously varying, preferably by the same quantity, said length of each of said accumulation segments, preferably keeping said accumulation segments substantially parallel to each other during said varying said length.

Also on the basis of this aspect it is possible to achieve the same advantages described in relation to the previous aspect.

The present invention, in at least one of the aforesaid aspects, may have at least one of the further preferred features set forth below.

Preferably, the movable portion moves according to a translation by performing an alternating rectilinear motion.

In this way it is possible to realize the technical advantages described above by minimizing the undesired contributions of the force of gravity, producing a compact and at the same time effective motion.

Preferably, the winding unit comprises a movement device of the at least one winding head configured to displace the at least one winding head along a working path.

Preferably, the winding head being movable along the working path so that the at least one strip-shaped article is submitted to a substantially constant tension during the winding of the strip-shaped article by means of a respective winding head and as a consequence of the movement of the winding head at least in a segment comprised between the feed unit and the at least one winding head.

In this way it is possible to keep the tension of the strip-shaped article substantially constant, making the processing steps more effective, reducing damages to the strip-shaped article itself and making the coil with high precision.

Preferably, the at least one winding head and the relative movement device configured to displace the same, are kinematically independent with respect to the movable portion. In this way it is possible to position the movement device more freely with respect to the movable portion, thus reducing any problems of synchronism and mutual encumbrance between them during the step of collaboration and/or exchange of material.

Preferably, the movement device of the at least one winding head is directly constrained to the movable portion downstream of the coupling roller.

In this way, the apparatus is more compact in its entirety, less cumbersome and although the movable portion can weigh more than other embodiments, the solution of the horizontal translation allows to have fewer complications relative to the displacements since the forces relative to the accelerations and decelerations according to vertical components are minimized. In addition, this form of collaboration between the movement device and the movable portion is more easily manageable allowing simple and effective movements.

Preferably, the movement device of the at least one winding head is directly mounted on the movable portion.

Preferably, the movement device of the at least one winding head is directly mounted on the movable portion with allowed rotation.

In this way, a particularly effective and compact type of movement of the at least one winding head is made.

Preferably, the movement device comprises a rotatable body configured to rotate about a rotation axis thereof.

Preferably, the movement device comprises a plurality of arms constrained to the rotatable body and hinged at one end thereof to the rotatable body with allowed rotation about a second rotation axis substantially parallel to the rotation axis and wherein, at an opposite end thereof, a respective winding head is hinged according to a winding axis thereof that is substantially parallel to the rotation axis.

Thanks to this solution, it is possible to easily define and modify a working path that is specifically elaborated and readily adaptable to different coil formation needs.

Preferably, the arms are extendable, or mounted on a cam to perform a displacement also according to radial components with respect to the rotation axis of the rotatable body.

In this way it is possible to realize complex working paths that comprise segments that are, for example, radial, tangential or combinations of them.

Preferably, the movement device comprises a rotatable body configured to rotate about a rotation axis thereof and the at least one winding head being directly constrained on the rotatable body with allowed rotation about a winding axis substantially parallel to the rotation axis.

Thanks to this solution, it is possible to realize a more compact version of the apparatus that reduces the relative overall dimensions and the weights of the devices adopted.

Preferably, the feed unit is configured so as to define a feed zone for each strip of the plurality of strips.

Preferably the feed zone is defined at least partially upstream of the movable portion. Preferably in said feed zone each strip of the plurality of strips moves along accumulation segments substantially parallel to each other.

Thanks to this solution, it is possible to provide for accumulation portions of the relative strips that move synchronously, therefore without any mutual misalignment and/or distortion introduced by different paths.

Preferably, the feed unit is configured so as to define a convergence zone, comprised between the feed zone and the coupling roller and internal to the movable portion.

Preferably, the plurality of strips converges at said convergence zone reducing the mutual distances between each strip up to the coupling roller that makes the strip-shaped article.

In this way it is possible to design in an optimized manner the zone and the process that are intended to form the final strip-shaped article. This condition is allowed by the possibility of making independent of each other the accumulation/feeding step of the strips with respect to the coupling/convergence step.

Preferably, a strip of the plurality of strips is fed according to a direction substantially parallel to the displacement direction of the movable portion in the convergence zone.

In this way it is possible to further reduce any stresses produced on a strip in the vicinity of and during the coupling step between the strips on the coupling roller.

In particular, the Applicant has noted that between the step of cutting the strips and their coupling some free ends can flex under the action of the displacements produced. Thanks to the technical solution described above, it is possible to reduce the deformations induced by these displacements, thus improving the final characteristics of the obtainable product.

Preferably, a strip of the plurality of strips is fed according to a direction substantially parallel to the displacement direction of the movable portion also at a portion of the feed zone.

In this way, the aforesaid problems correlated to potential damages are further reduced even during the displacements in the feed zone. Preferably, said strip fed according to a direction substantially parallel to the displacement direction of the movable portion, also at a portion of said feed zone, is a conductor, for example an anode or a cathode.

Preferably the at least one winding head is movable along a working path and the correlated method comprises moving the at least one winding head such that the strip-shaped article is submitted to a substantially constant tension.

In this way it is possible to process the strip-shaped article effectively without keeping its profile constant and avoiding introducing undesired damages or deformations.

Preferably, the method envisages using the feed unit which is configured in such a way as to be able to move each strip of the plurality of strips along respective accumulation segments substantially parallel to each other in a defined portion of the feed zone at least partially upstream of the movable portion.

In this way it is possible to keep the strips of the plurality of strips synchronous with each other. Preferably, the method envisages using the feed unit that is configured in such a way as to converge the plurality of strips in a convergence zone, comprised between the feed zone and the coupling roller and internal to the movable portion, reducing the mutual distances between each strip of the plurality of strips up to the coupling roller that makes the strip-shaped article.

In this way it is possible to couple the strips in the strip-shaped article in a dedicated and optimized area for this operation.

Preferably, each winding head supports a gripping device that is configured to grasp a portion of said strip-shaped article, said gripping devices being further preferably configured to rotate on themselves about a winding axis so as to wind said strip-shaped article.

Thanks to this characteristic, the strip-shaped article can be easily grasped so that it can then be wound by rotation of the same device gripping it. In this way the rotation speed as well as the trajectory and the speed of the winding heads while they are winding the strip-shaped article can be easily controlled.

Preferably said feed unit defines a feed direction of said strip-shaped article.

In this way the feed unit itself defines the direction in which the strip-shaped article is fed, i.e. the direction in which it arrives at the winding heads and is then grasped and wound.

In the case where the strip-shaped article is formed by several strips, the feed direction coincides with that of the article after the strips have been combined between them.

Preferably said movement device is configured to wind said strip-shaped article during a displacement of said winding heads. Preferably said displacement of the respective winding head while winding is in a direction discordant with said feed direction.

Thanks to this characteristic, it is possible to reduce the length of the strip-shaped article, or keep it minimal, during the winding of the strip. In this way, situations that can cause states of tension on the strip are limited and it is generally possible to perform high winding speeds.

It should be noted that with the term "discordant" and with its opposite term "concordant" referred to two directions, it is understood that these directions are travelled in opposite directions, with regard to discordant, or in the same direction, with regard to concordant.

The directions do not necessarily have to be parallel and, in this case, two directions will be considered discordant when the component of one direction substantially parallel to the second one defines a path along which an object is displaced in the opposite oriented direction with respect to the other oriented direction.

This concept is illustrated schematically in FIG. 11, in which the two directions are illustrated by means of a continuous line and are respectively indicated with the letters a and b, while the component parallel to the second direction is illustrated by means of a dotted line and is indicated with the letter c. In the example depicted in the figure, the two directions are represented as discordant, as can be noted from the arrows present in the two lines.

Preferably, said displacement of the respective winding head along an operative segment is substantially parallel to said feed direction.

The term "substantially parallel", in the context of the present invention, will indicate a possible deviation by ±10°, preferably +5°, with respect to a perfect parallelism.

Thanks to this characteristic, the winding head can follow the advancement movement of the strip and/or move in a direction opposite to that of the advancement of the strip in such a way as to wind it under such a condition. Each of these characteristics further contributes to making the winding of the strip and hence the formation of the coil faster and more efficient.

Preferably said feed unit comprises an outlet section through which said strip-shaped article passes when it exits said feed unit and is fed to said winding unit and an inlet section preferably adapted to receive said at least one strip from a respective dispensing device, a feed path of said strip being comprised between said inlet section and said outlet section.

Preferably said feed unit comprises a movable portion at which said outlet section is preferably formed.

Thanks to the presence of a movable portion in the feed unit, it is possible to modify the position of the section from which the strip-shaped article exits to be supplied to the winding heads. In this way the winding heads will be able to grasp the strip-shaped article more easily, as well as it will be possible to adjust the distance between the heads and the feed unit and, consequently, the length of the strip between the head on which it is wound and the feed unit.

Preferably the apparatus comprises a cutting device configured to cut said strip-shaped article at a position downstream of said feed unit.

The term "cut" referred to a strip or other article means creating an interruption in the continuity of the strip or of the element, defining two distinct, separate and kinematically independent portions.

The cut can be carried out with any type of device, both with contact cutting devices, such as for example a knife, and without contact, for example by laser ablation.

The presence of the cutting device downstream of the feed unit allows making unnecessary the stop of the strip in the moment in which it is cut, making it possible to coordinate the cutting action with the movement of the head performed by means of the relative movement device.

Preferably said feed unit and said movement device are configured such that in preparation for when said cutting device cuts said strip-shaped article, a respective winding head is positioned at a predetermined distance from said feed unit, said predetermined distance being preferably substantially equal to a minimum distance from said feeding head.

By the term “substantially equal” referred to a minimum distance between two components it will be understood in the context of the present invention that during the different operating steps of the apparatus the two components may also be at a slightly shorter distance, however, overall, and compatibly with the kinematic mechanisms that set the two components in motion and with their overall dimensions, this distance can be considered as the minimum obtainable.

In other words, the winding heads, during their movement along the working path, may also be at a shorter distance than that at which they are in the aforesaid cutting step, however in the context of this operation, the distance at which they are located is the minimum at which they can be positioned to allow the approach and the use of the devices used for cutting and compatibly with the kinematic mechanisms used for the movement.

Thanks to this characteristic, it is possible to minimize the length of the part of the strip-shaped article exiting from the feed unit in the moment in which the cut is made, thus simplifying management and, in particular, the winding operations on the two lengths of strip-shaped article which are generated after the cut.

Preferably said feed unit and said movement device are configured such that when said cutting device cuts said strip-shaped article, said respective winding head is positioned at said minimum distance from said movable portion.

Based on this characteristic, the movement of the movable portion can be advantageously exploited to perform the positioning of the aforesaid winding head at the minimum distance.

Preferably said cutting device is movable integrally with said winding head and/or with said strip-shaped article.

Preferably said movement device is configured to displace, along said working path, said winding heads according to a trajectory which includes at least:

A rotation about a rotation axis of said movement device, said rotation axis being different from said winding axis; and A translation and/or a rotation about a further axis, different from said rotation axis and from said winding axis.

This feature makes it possible to perform, by means of special kinematic mechanisms, a cyclical movement of the winding heads, which can be obtained by rotation about the rotation axis of the movement device, with further movements of said heads obtained by a translation and/or by further rotation movements.

In this way, it is possible to obtain, with a constructively simple solution and, as such, able to perform high speeds, the trajectories necessary for the winding heads, in order to carry out the winding of the strip during the movement of the head itself, without this entailing states of tension or movements that are difficult to control for the strip.

Preferably said winding heads and said movable portion are movable in a coordinated manner, said movement device being configured to move said winding heads along said operative segment in such a way as to keep a respective winding head, on which said strip-shaped article is wound, at a predetermined distance from said movable portion while said winding head is moving.

Thanks to these characteristics, it is possible to control, during the processes of making the coil, the distance between the feed unit and the winding head, providing for the appropriate distance in order to carry out the winding, minimizing the states of tension and allowing, when necessary, the cutting of the strip-shaped article.

Preferably said at least one strip-shaped article is submitted to a substantially constant tension, at least for a segment comprised between said feed unit and a respective winding head on which said strip-shaped article is wound.

It will be appreciated that thanks to the present invention it is possible to submit the strip-shaped article to a substantially constant tension, in particular while making the coil, thanks to the fact that the winding takes place while the winding head is being displaced.

Preferably said feed unit is configured to feed said strip-shaped article at a feed speed, said winding heads being configured to wind said strip at a winding speed and being configured to be displaced at a displacement speed, said winding speed and said displacement speed being preferably such as to submit said strip-shaped article to said substantially constant tension.

In this way it is possible to control the tension by simply controlling the speeds on the basis of which the apparatus is made to operate, thus allowing easy control of the operating steps of the same.

Preferably said feed speed is substantially equal to the sum of said winding speed and said displacement speed.

This condition allows a substantially constant tension to be kept in the strip-shaped article, with no need for this to be stopped during winding or in general during the formation of the coil.

Preferably said strip-shaped article comprises a plurality of strips overlapped into layers, at least one of said strips being continuously fed.

Preferably said feed speed is constantly greater than zero, and preferably substantially constant, along said feed path.

These characteristics allow to each one to make the coil without interrupting feeding the strip, thus avoiding interruptions in the movement of the strips that might generate unwanted states of tension or in any case decrease the productivity of the apparatus. However, it will be understood that one or more strips can be locally slowed down or stopped between inlet and outlet from the feed unit, without however creating an interruption in their movement. This can be obtained for example by locally accumulating one or more strips or in other words by lengthening and/or shortening the path of the strip between inlet and outlet of the feed unit.

Preferably, said feed unit comprises a coupling roller, said strips being arranged so as to converge towards said coupling roller on which said strips are partially wound in such a way that, downstream of said coupling roller, said strips are grouped to form said strip-shaped article.

Preferably, said outlet section is defined at said coupling roller.

Preferably, said coupling roller is connected to said movable portion.

Thanks to these characteristics, it is possible to group the strips in order to obtain a multilayer strip-shaped article with a solution that allows a continuous advancement of the strips. Furthermore, the position at which the strips are coupled can be advantageously modified during the different operating steps of the apparatus.

Preferably said operative segment comprises at least a first and a second portion, preferably substantially parallel to each other.

This characteristic makes it possible to obtain an operative segment that is highly extended and to use a relatively simple movement device from a construction point of view, since it is possible to use kinematic mechanisms that are not excessively complex for two substantially parallel segments to travel.

Preferably said movement device is configured to displace each winding head in a first direction along said first portion and in an opposite direction with respect to said first direction, in said second portion.

In this way, the overall dimensions of the movement device or, more generally, of the apparatus can be optimized as the winding heads can move along two substantially parallel segments in two directions opposite one another.

Preferably each gripping device is configured to wind said strip-shaped article along said first portion at a different speed with respect to said second portion.

Thanks to the use of different winding speeds it is possible to keep a substantially constant tension on the strip-shaped article during its winding, in particular in the case where it is continuously fed. Preferably said winding head is displaced in a direction concordant to said feed direction in said first portion and in a direction discordant to said feed direction in said second portion, said winding head being preferably configured to wind said strip-shaped article at a higher speed when a respective winding head is displaced in a direction discordant to said feed direction.

Thanks to these characteristics, it is possible to optimally exploit the movement of the winding head to carry out the winding of the strip-shaped article as rapidly as possible, taking into account the fact that during the winding the winding head moves and, at the same time, the strip-shaped article continues to be fed.

Preferably said operative segment comprises a third portion, preferably substantially parallel to said first and/or second portion, wherein said winding head is again displaced in a direction concordant to said feed direction along said third portion.

The presence of a third portion makes it possible to further exploit the characteristics of the movement device in the context of a cyclic solution and which, preferably, provides for the displacement of the winding heads along a closed path.

Preferably, said strip-shaped article is wound during the displacement of said movement head along said first portion and/or said second portion and/or said third portion.

Preferably, said movement device is configured to wind said strip-shaped article for a quantity comprised between 5% and 15%, preferably 10%, of an overall length of strip-shaped article used for forming a single coil along said first portion, for a quantity comprised between 70% and 90%, preferably 80%, of said overall length of strip-shaped article used for forming the single coil along said second portion and for a quantity comprised between 5% and 15%, preferably 10%, of said overall length of strip-shaped article used for forming the single coil along said third portion.

In this way the winding takes place mainly while the winding head returns, that is along the second portion, along which the winding can take place at a higher speed as the winding head moves in a direction discordant with respect to the feed direction.

Preferably, the apparatus comprises an accumulation device configured to accumulate a quantity of at least one of said plurality of strips between said inlet section and said outlet section and an actuation device of the accumulation device that preferably displaces said accumulation device to vary the accumulated quantity of strip.

Thanks to this characteristic, it is possible to provide for steps in which, while continuing to make at least one of the strips advance, this is not supplied, and in particular wound, to the winding heads. In this way, the cutting steps can be managed at best and/or it is possible to provide for strips with different lengths in the case of a strip-shaped article formed by a plurality of overlapped layers.

Preferably said accumulation device comprises at least one movable element configured to vary an overall length of said feed path by movement of said movable element.

Preferably said movable element is formed by said movable portion.

Preferably said movement device is configured to move integrally with said movable portion and, preferably, is rotatably supported on said movable portion.

In this way it is possible to accumulate simultaneously all the strips forming the strip-shaped article, for example when the movement device, and hence the movable portion, move along the first portion of the operative segment, and to quickly wind the strip thus accumulated, when it returns to the second portion of the operative segment.

Preferably said movable element comprises at least one movable roller, said at least one strip being wound on said movable roller and on at least one fixed roller so as to vary said overall length. Preferably said movable roller and said fixed roller are configured to rotate idly.

Thanks to this characteristic, it is possible to stagger the advancement of a single strip, or of more specific strips, with respect to the remaining strips in the case where the strip-shaped article is formed by several overlapped strips, with no need to stop the advancement of the strips. In this way, by cutting at predetermined positions the strip that has been accumulated, it is possible to obtain portions of the strip-shaped article in which one or more of the strips forming the multilayer structure is not present. This is particularly advantageous in the case of a coil for electrochemical cells, in which a terminal part of the coil in which only portions of separator strips are present is typically envisaged.

Preferably said feed unit comprises a device for holding at least one of said one or more strips configured to slow down or stop the feeding of at least one of said one or more strips through said outlet section.

Preferably said accumulation device is configured in such a way as to accumulate said strip when said holding device slows down or stops the feeding of said strip.

In this way the accumulation devices can operate when the strip is slowed down or stopped, thus avoiding that this causes tensions on the strip and allowing to continuously make the single strip advance without this being fed through the outlet section of the feed unit.

Preferably said operative segment includes at least one substantially rectilinear segment.

The presence of a rectilinear segment along which the winding takes place is particularly advantageous in order to avoid undesired states of tension on the strip-shaped article.

Preferably, the rectilinear segment is substantially parallel to the feed direction, so as to further contribute to the absence of states of tension on the strip-shaped article while making the coil.

Preferably said first portion and/or said second portion and/or said third portion each form a respective rectilinear segment.

Preferably said winding heads are configured to discharge said coil following the, at least partial, winding of said at least one strip, said working path comprising a reset segment along which each of said winding heads is displaced from a discharge position to a gripping position in which said winding head grasps said portion of said at least one strip-shaped article. Preferably said working path is closed.

In this way, the apparatus can operate in a cyclical manner, advantageously providing an operating part in which the winding heads carry out the winding and, in general, make the coil, and a reset part in which the heads can return to a suitable position to restart the cycle.

This is furthermore particularly advantageous in the case in which there is a rectilinear path or, in any case, one wishes to concentrate the winding operations in a specific zone, since it is sufficient to control the rotation of the heads and their behaviour with respect to the strip-shaped article in this zone, simplifying the required kinematic mechanisms.

Preferably, said operative segment has a length equal to at least 5%, preferably at least 10%, preferably at least 15%, preferably at least 20% of an overall length of the working path.

Preferably, in such an operative segment the winding of the strip-shaped article takes place during the displacement of the respective winding head on which the strip-shaped article is wound.

Therefore, in other words, such displacement will cover a substantial part of the overall working path of the winding head. It will therefore be appreciated that the movement of the winding head is not limited to compensating for any differences in diameters that are caused during winding, or for minimal displacements of the strip-shaped article with respect to its movement feed direction during winding.

In this way it is possible to make sure that the head follows the advancement of the strip-shaped article during its movement and the formation of the coil. Furthermore, this makes it possible to exploit in a suitable manner the operative segment, along which the winding head moves and winds the strip-shaped article, to coordinate in a suitable manner the operation of two or more winding heads, for example by envisaging that one head starts winding one coil, whereas another one ends winding another.

Preferably, said cutting device is configured to cut said strip-shaped article along said operative segment of said working path and, preferably, in an intermediate zone of said working path.

Thanks to this characteristic it is possible to exploit the movement of the winding head in various steps, both for winding and for cutting and the transport of the coil thus cut up to a discharge zone of the same.

Preferably said plurality of winding heads comprises at least a first winding head and a second winding head, said movement device being configured in such a way as to vary the distance between said first winding head and said second winding head along said working path.

The possibility of varying the distance between the two winding heads makes it possible to efficiently manage the steps of making the coil, in particular by varying the distance between the two heads between the steps in which the winding takes place and those in which the strip-shaped article is cut.

Preferably said movement device is configured in such a way as to approach said first winding head to said second winding head along said working path when said cutting device performs the cut of said strip-shaped article.

In this way it is possible to perform the cut between the two winding heads minimizing the dimensions of the two flaps of the strip-shaped article which are generated after the cut, one head being as close as possible to the other.

Preferably said movement device is configured in such a way as to move said first winding head away from said feed unit and being further configured in such a way as displace said second winding head to an intermediate position between said first winding head and said feed unit along said operative segment when said first winding head is moved away.

Thanks to this characteristic, it is possible to arrange the second winding head so that it grasps the strip-shaped article while the other winding head is still winding, or in any case grasping, the strip-shaped article itself. In this way, in the moment in which the second movement head grasps the strip-shaped article, this is still wound on the first winding head.

Preferably said movement device is configured in such a way that when said first winding head travels along said third portion, said second winding head, which precedes said first winding head along said working path, travels along said first portion.

Also this characteristic allows to optimize the overall dimensions of the apparatus and to perform, at least in part, the winding of two coils simultaneously, in that, after having cut the strip-shaped article, the first winding head ends winding the remaining flap along the third portion and the second winding head starts winding along the first portion.

Preferably, each gripping device comprises a pair of pins configured to hold said strip-shaped article between them, at least one of said pins being movable so as to join the other pin holding said strip-shaped article between them.

The presence of the pins allows to grasp and block the strip-shaped article, in such a way as to carry out the winding, in a simple way and as part of a continuous and automated process.

Preferably said winding axis is aligned with a longitudinal extension direction of said pins.

Preferably said at least one pin is movable along an extraction direction transverse, preferably perpendicular, to the feed direction of said strip-shaped article.

In this way it is possible to arrange the strip-shaped article in a sandwich configuration between the two pins during the approach of the winding head to the article itself as a single pin is approached to the strip during the movement of the head, the other being instead brought at the first pin only once this one has reached the strip. Once in this position, the pins can start rotating around themselves, starting to wind and grasp the strip.

Preferably said pins are both movable, said pins being configured so as to be movable both independently of each other and in conjunction with each other, said pins being both configured so as to move along said extraction direction.

In this way the same pins can be advantageously used both for grasping the strip-shaped article and starting the winding thereof, and for discharging the coil once it has been made.

Preferably, each of said strips defines a respective feed path, said feed paths comprising a respective accumulation segment, said accumulation segments being substantially parallel to each other.

Preferably, two or more of the group formed by: at least one of said accumulation segments, the feed direction of the strip-shaped article, the displacement direction of the movable portion and at least one of the portions of the operative segment, are substantially parallel to each other.

Preferably, said accumulation segments, said feed direction of the strip-shaped article, said displacement direction of the movable portion and at least one of the portions of the operative segment, are all substantially parallel to each other.

Preferably said feed unit is configured so as to vary, preferably in a coordinated manner with said movement of said movable portion along said displacement direction, a respective longitudinal extension of each of said accumulation segments.

In this way it is possible to keep a constant tension even during the accumulation of the strips forming the strip-shaped article, without therefore the movement of the movable portion generating undesired tensions on the strips.

Preferably, said accumulation segment(s) extend(s) between a respective pair of diverter rollers, preferably idle. Preferably a diverter roller of said pair is supported on said movable portion.

This characteristic allows the strips to slide during their accumulation and, in particular, during the movement of the movable portion, so as not to generate undesired tensions, as previously illustrated.

Preferably said longitudinal extension of said accumulation segments is varied simultaneously, by a same quantity, and keeping said accumulation segments substantially parallel to each other.

Thanks to this characteristic it is possible to use the displacement of the movable portion to accumulate simultaneously the same quantity of strip for each of the strips forming the strip-shaped article. In this way it is possible to use a continuous feeding of the strips while nonetheless providing for steps in which the strip-shaped article is not wound.

Preferably, combining said strips into layers comprises converging said strips, downstream of said accumulation segments, towards an outlet section through which said strip-shaped article is supplied to said winding head.

In this way, between one strip and the other, before the outlet section, a space can be defined for placing the grippers and the knives that can be used to cut one or more of the strips before being combined to form the strip-shaped article.

Preferably said strip-shaped article is grasped by a gripping device, said strip-shaped article being wound by rotation of said gripping device about a winding axis.

Also this characteristic allows to easily grasp the strip-shaped article which can then be wound by rotation of the same device gripping it. In this way the rotation speed and the trajectory and the speed of the winding heads while they are winding the strip-shaped article can be easily controlled. Preferably it can be provided that grasping said portion of said strip-shaped article comprises feeding said strip-shaped article, said strip-shaped article being fed by displacement in a feed direction.

In this way the feed unit itself defines the direction in which the strip-shaped article is fed, i.e. the direction in which it arrives at the winding heads and is then grasped and wound.

Preferably said strip-shaped article is wound during a displacement of said winding heads. Preferably said winding head is displaced in a direction discordant with respect to said feed direction when it winds said strip-shaped article.

Also thanks to this characteristic it is possible to reduce the length of the strip-shaped article, or in any case keep it minimal, during the winding of the strip. In this way, situations that can cause states of tension on the strip are limited and it is generally possible to perform high winding speeds. In preferred embodiments it may be envisaged feeding said strip-shaped article to said winding head, said strip-shaped article being preferably fed through an outlet section of said strip-shaped article.

Preferably said outlet section is movable along a displacement direction, said displacement direction being preferably substantially parallel to said feed direction.

Preferably said outlet section is movable forwards and backwards along said displacement direction.

By moving the outlet section it is possible to modify the position from which the strip-shaped article exits to be supplied to the winding heads. In this way the winding heads will be able to grasp the strip-shaped article more easily, as well as it will be possible to adjust the length of the strip between the head on which it is wound and the feed unit.

In preferred embodiments it may be envisaged cutting said strip-shaped article in a position downstream of said feed unit.

By cutting the strip-shaped article downstream of the feed unit, it is possible to make stopping the strip unnecessary in the moment in which it is cut, making it possible to coordinate the cutting action with the movement of the head performed through the relative movement device.

Preferably said winding head is positioned at a minimum distance from said outlet section in preparation for said step of cutting said strip-shaped article.

Also thanks to this characteristic, it is possible to minimize the length of the part of the strip-shaped article exiting from the feed unit when the cut is made, thus simplifying the management and, in particular, the winding operations on the two lengths of strip-shaped article which are generated after the cut.

Preferably, the method comprises providing a cutting device for cutting said strip-shaped article and displacing said cutting device integrally with said movable portion and/or with said winding head and/or with said strip-shaped article, while the strip-shaped article is being cut.

In this way it is possible to perform the cut during the movement of the winding heads, without therefore needing to stop the strip and, consequently, allowing a continuous process for making the coil.

In preferred embodiments it may be envisaged moving said winding heads according to a trajectory formed at least by:

a rotation about a rotation axis of said movement device, said rotation axis being different from said winding axis; and a translation and/or a rotation about a further axis, different from said rotation axis and from said winding axis.

Thanks to these steps, it is possible to obtain, with a constructively simple solution and, as such, able to perform high speeds, the trajectories necessary for the winding heads, in order to perform the winding of the strip during the movement of the head itself, without this entailing states of tension or movements that are difficult to control for the strip.

In preferred embodiments, it may be envisaged moving simultaneously said outlet section and said winding head to which said strip-shaped article is fed, keeping them at a predetermined distance. Also thanks to these characteristics, it is possible to control, in the various steps of making the coil, the distance between the feed unit and the winding head, providing for the appropriate distance in order to carry out the winding, minimizing the states of tension and allowing, when necessary, the cutting of the strip-shaped article.

Preferably, it can be envisaged moving simultaneously said outlet section and said winding head, while said winding head is winding said strip-shaped article. Said strip-shaped article is grasped and is moved by said winding head in such a way that said strip-shaped article is submitted to a substantially constant tension upstream of said winding head.

In this way, it is possible to submit the strip-shaped article to a substantially constant tension, in particular while making the coil, thanks to the fact that the winding takes place while the winding head is being displaced.

Preferably said shaped strip-shaped article is fed through said outlet section at a feed speed substantially equal to the sum of a winding speed of said strip-shaped article and a displacement speed at which said winding head on which said strip-shaped article is being wound is displaced. In this way it is possible to control the tension by simply controlling the speeds on the basis of which the apparatus is made to operate, thus allowing easy control of the different operating steps. In preferred embodiments it may be envisaged combining a plurality of layers so as to form said strip-shaped article, at least one of said strips being continuously fed.

Preferably said feed speed is constantly greater than zero, and still more preferably substantially constant.

Also these characteristics allow to make the coil without interrupting feeding the strip, thus avoiding interruptions in the movement of the strips that might generate unwanted states of tension or in any case decrease the productivity of the apparatus.

Preferably, it is envisaged coupling said strips to form said strip-shaped article by partially winding them on a coupling roller.

Preferably, said outlet section is defined at said coupling roller.

Also thanks to these characteristics, it is possible to group the strips in order to obtain a multilayer strip-shaped article with a solution that allows a continuous advancement of the strips. Furthermore, the position at which the strips are coupled can be advantageously modified during the different operating steps of the apparatus.

In preferred embodiments it may be envisaged moving said winding heads along a first and a second portion of said operative segment which are substantially parallel to each other, each winding head being displaced in a first direction along said first portion and in a direction opposite to said direction, in said second portion.

In this way it is possible to obtain an operative segment that is widely extended and to use a movement device that is relatively simple from a construction point of view, since it is possible to use kinematic mechanisms that are not excessively complex for two substantially parallel segments to travel.

Furthermore, the operating steps of the winding heads or more generally of the method according to the present invention can be optimized as the winding heads can move along two parallel or even substantially coincident segments, but in two directions opposite to each other.

Preferably each gripping device is configured to wind said strip-shaped article along said first portion at a different speed with respect to said second portion.

Preferably said winding head is displaced in a direction concordant to said feed direction in said first portion and in a direction discordant to said feed direction in said second portion.

Said strip-shaped article is preferably wound at a higher speed when a respective winding head is displaced along said second portion.

Thanks to the use of different winding speeds it is possible to keep a substantially constant tension on the strip-shaped article during its winding, in particular in the case where it is continuously fed. In preferred embodiments, it can be envisaged moving said winding heads along a third portion of said operative segment, preferably substantially parallel to said first and second portion, said winding head being preferably displaced in a direction concordant to said feed direction along said third portion.

Thanks to these characteristics, it is possible to optimally exploit the movement of the winding heads to carry out the winding of the strip-shaped article as rapidly as possible, taking into account the fact that during the winding the winding head moves and, at the same time, the strip-shaped article continues to be fed.

Preferably at least one of said strips advances at a substantially constant speed along a segment comprised between an inlet section through which said strips are individually supplied and said outlet section.

In preferred embodiments, it may be envisaged accumulating a quantity of said at least one strip before it is grasped by said winding head, and preferably said accumulated quantity being variable during the displacement of said winding heads.

Preferably said strips comprise conductor strips and/or separator strips, said method comprising accumulating at least one of said conductor strips during an advancement thereof between said inlet section and said outlet section.

Also thanks to this characteristic it is possible to envisage steps in which, while continuing to make at least one of the strips advance, this is not supplied, and in particular wound, to the winding heads. In this way, the cutting steps can be managed at best and/or it is possible to provide for strips with different lengths in the case of a strip-shaped article formed by a plurality of overlapped layers.

Preferably it may be envisaged slowing down or stopping feeding one or more of said strips, said variable quantity of one or more of said strips that is accumulated being accumulated when said feeding is slowed down or stopped.

In this way, the accumulation of the strip can take place when it is slowed down or stopped, thus preventing tensions from being generated on the strip and allowing to continuously make the single strip advance without this being fed through the outlet section of the feed unit.

Preferably said outlet section is displaced, preferably along said displacement direction, when said strip-shaped article is accumulated.

Preferably said winding heads move simultaneously, keeping themselves at a substantially constant distance from each other.

Preferably, the winding heads move integrally with said outlet section.

In this way it is possible to accumulate simultaneously all the strips forming the strip-shaped article, for example when the movement device, and hence the movable portion, move along the first portion of the operative segment, and to quickly wind the strip thus accumulated, when it returns to the second portion of the operative segment.

Preferably accumulating said at least one strip comprises varying a distance travelled by said at least one strip between said inlet section and said outlet section.

Also thanks to this characteristic, it is possible to stagger the advancement of a single strip, or of more specific strips, with respect to the remaining strips in the case where the strip-shaped article is formed by several overlapped strips, with no need to stop the advancement of the strips.

Preferably said operative segment includes a substantially rectilinear segment.

The presence of a rectilinear segment along which the winding takes place is particularly advantageous in order to avoid undesired states of tension on the strip-shaped article.

In preferred embodiments, it may be envisaged discharging said coil after the, at least partial, winding of said strip-shaped article, said winding heads being returned, after having discharged said coil, to a gripping position along said working path at which they grasp said portion of strip-shaped article.

Also these characteristics contribute to making it possible that the method of the present invention can take place in a cyclic manner, advantageously providing for an operating part in which the winding heads perform the winding and, in general, make the coil, and a reset part in which the heads can return to a position suitable for restarting the cycle.

Preferably said plurality of winding heads comprises at least a first winding head and a second winding head, said method comprising varying the distance between said first winding head and said second winding head along said working path.

The variation of the distance between the two winding heads makes it possible to efficiently manage the steps of making the coil, in particular by varying the distance between the two heads between the steps in which the winding takes place and those in which the strip-shaped article is cut.

Preferably it may be envisaged approaching said first winding head to said second winding head along said working path in preparation for said step of cutting said strip-shaped article.

In this way the cut of the strip-shaped article is carried out between the two winding heads minimizing the dimensions of the two flaps of the strip-shaped article which are generated after the cut, one head being as close as possible to the other.

Preferably it may be envisaged moving said first winding head away from said outlet section and positioning said second winding head in an intermediate position between said first winding head and said outlet section, while said first winding head is grasping said portion of said strip-shaped article.

Also thanks to this characteristic, it is possible to arrange the second winding head so that it grasps the strip-shaped article while the other winding head is still winding, or in any case grasping, the strip-shaped article itself. In this way, in the moment in which the second movement head grasps the strip-shaped article, this is still wound on the first winding head.

Preferably when said first winding head travels along said third portion, said second winding head, which precedes said first winding head, travels along said first portion.

Also this characteristic allows to optimize the overall dimensions of the apparatus. Furthermore, it may preferably be envisaged performing, at least in part, the winding of two coils simultaneously, in that, after having cut the strip-shaped article, the first winding head ends winding the remaining flap along the third portion and the second winding head starts winding along the first portion.

Preferably grasping said portion of strip-shaped article comprises arranging said portion of strip-shaped article between a pair of pins, at least one of said pins being movable so as to join the other pin holding said strip-shaped article between them.

In this way, it is possible to grasp and block the strip-shaped article, in such a way as to carry out the winding, in a simple way and as part of a continuous and automated process.

Preferably said pin is movable along an extraction direction transverse, preferably perpendicular, with respect to said feed direction of said strip-shaped article.

Thanks to this characteristic, during the movement of the head, a single pin is approached to the strip, the other being instead brought at the first pin only once this one has reached the strip.

Preferably said pins are both movable, said method comprising moving said pins independently of each other to grasp said portion of strip-shaped article and moving said pins in conjunction with each other to discharge said coil from said winding head, once said coil has been made by winding said strip-shaped article.

In this way the same pins can be advantageously used both for grasping the strip-shaped article and starting the winding thereof, and for discharging the coil once it has been made.

It should be noted that some steps of the methods described above may be independent of the order of execution reported. In addition, some steps may be optional. In addition, some steps of the methods may be performed repetitively, or they may be performed in series or in parallel with other steps of the method.

The characteristics and the advantages of the invention will become clearer from the detailed description of a preferred embodiment example thereof, shown by way of non-limiting example, with reference to the appended drawings wherein.

Figure 11:
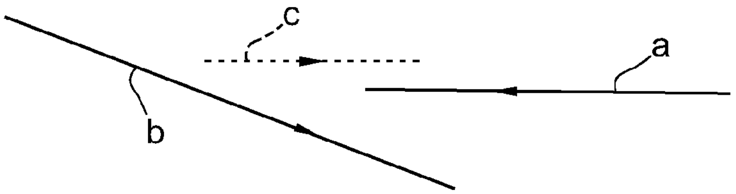
Figure 12:
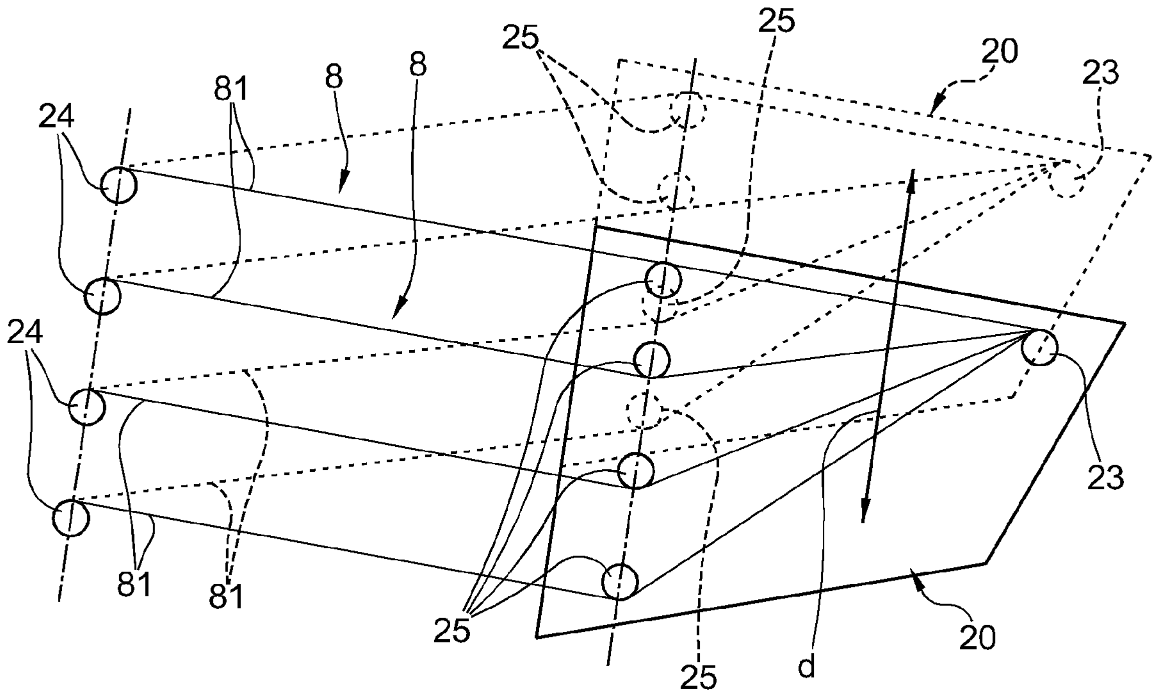
Figure 13:
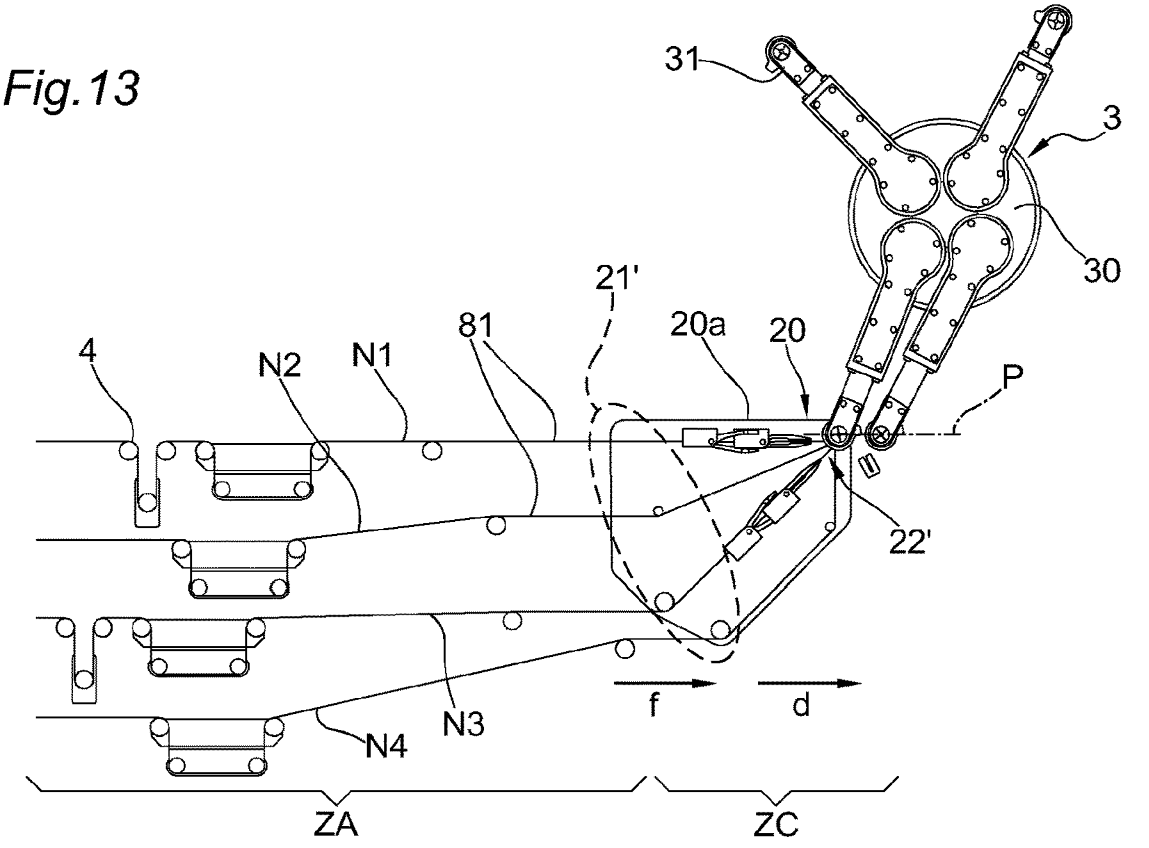
Figure 14:
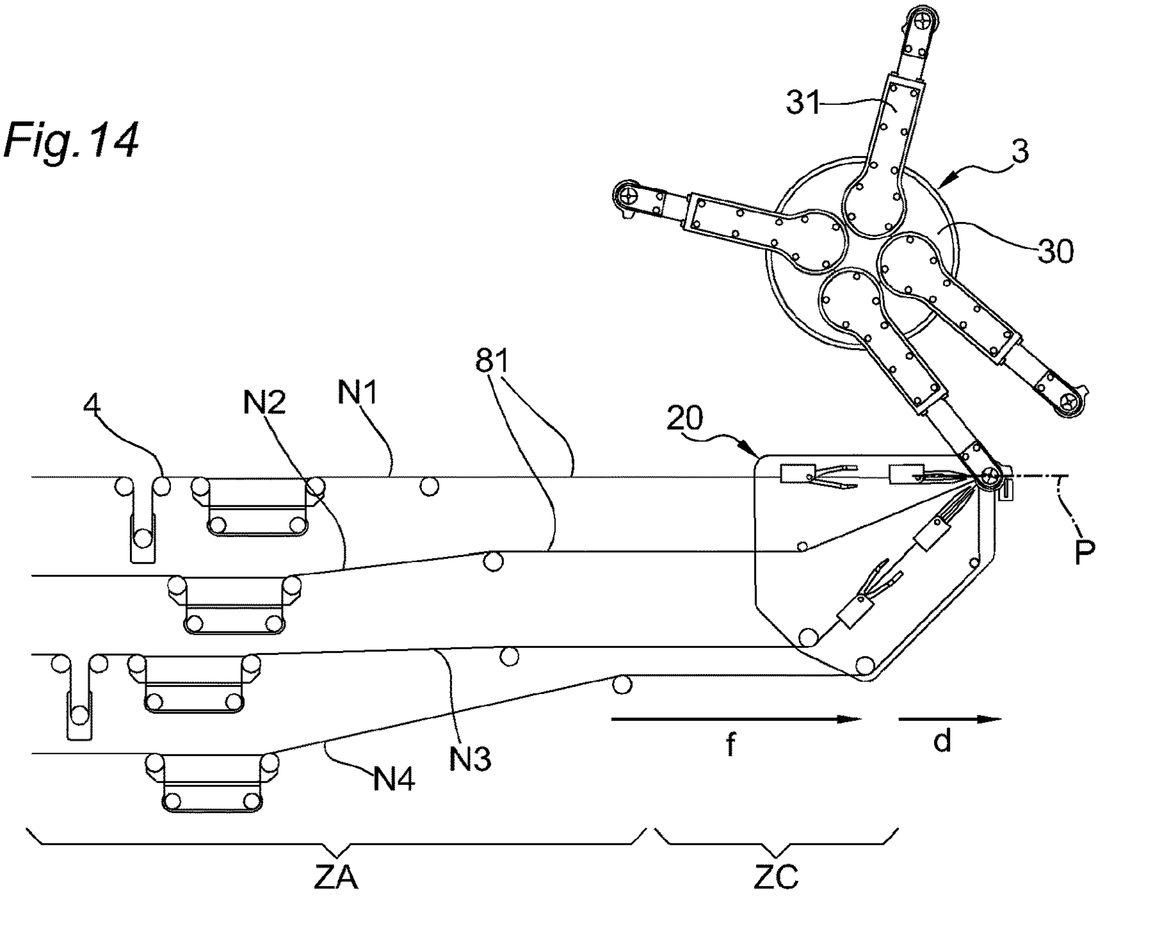
Figure 15:
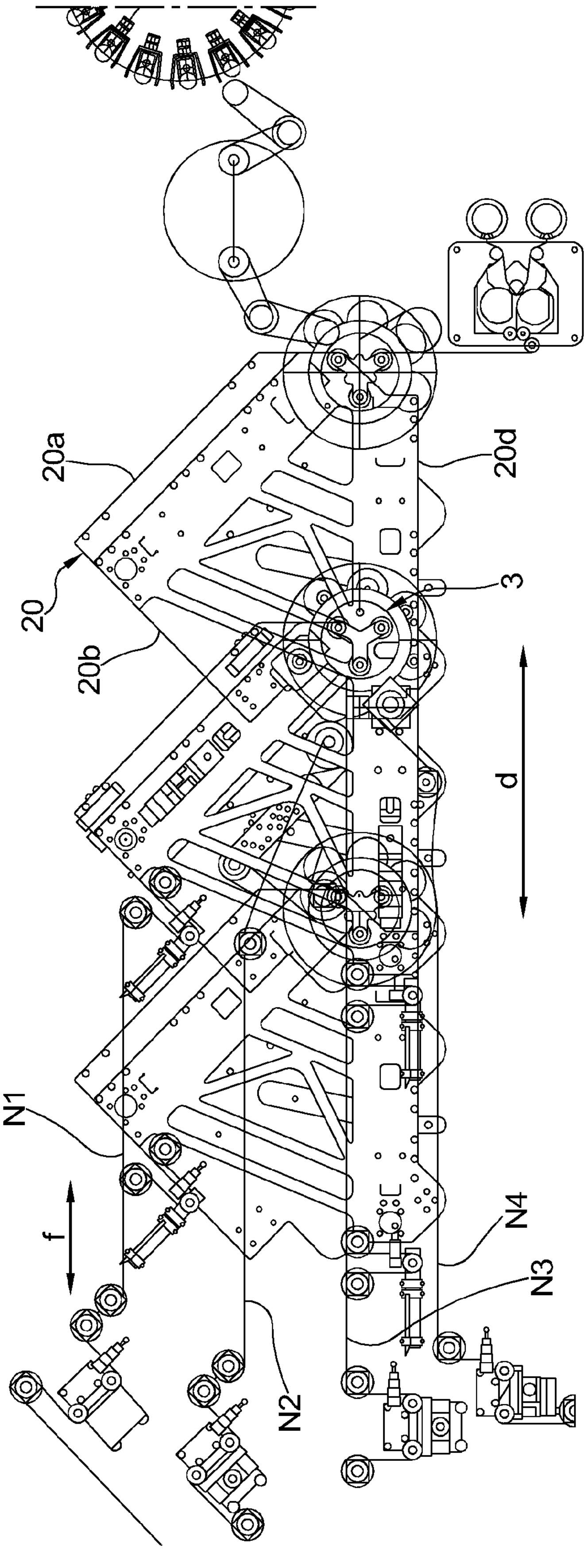
Figure 16:
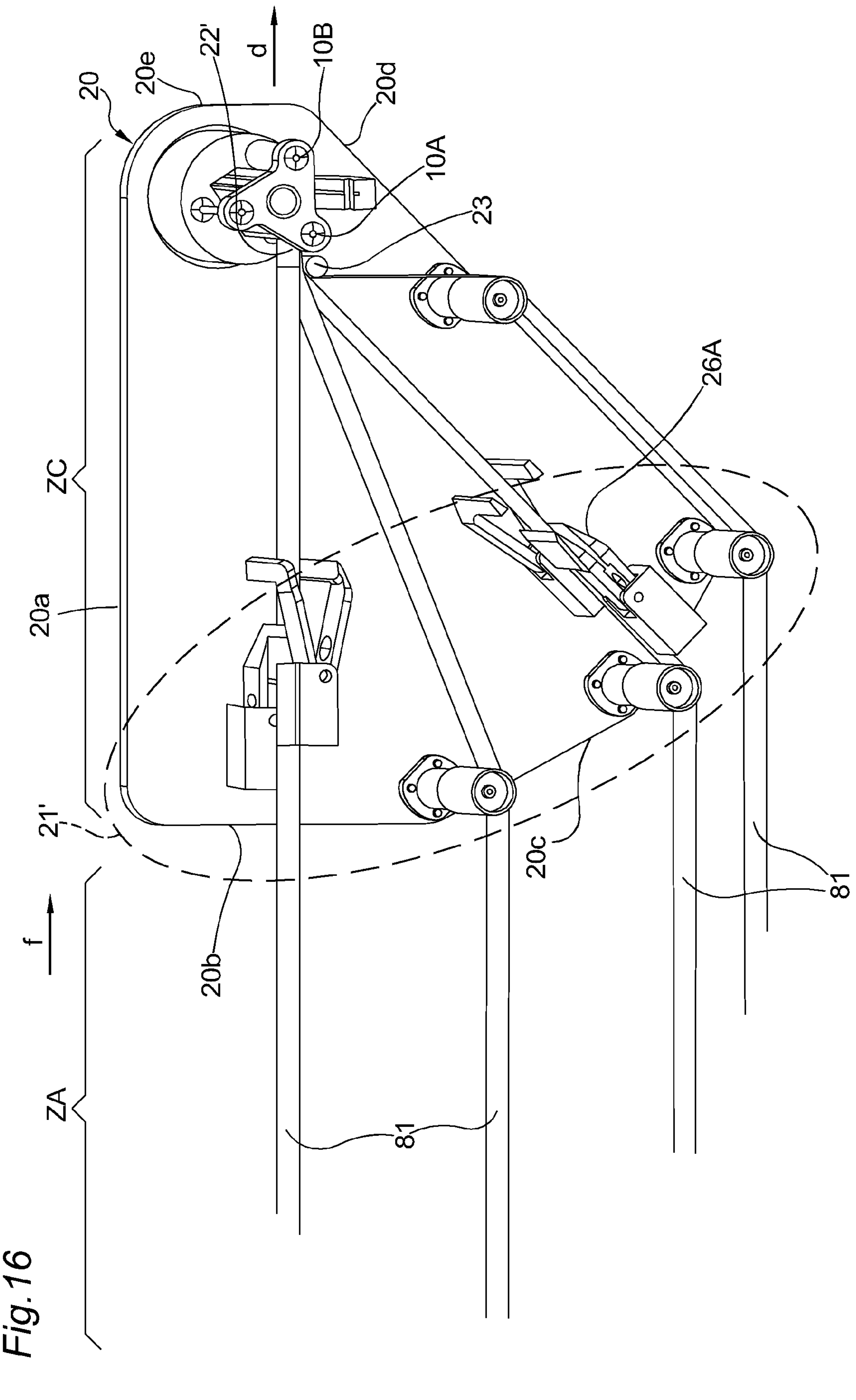
Figure 17:
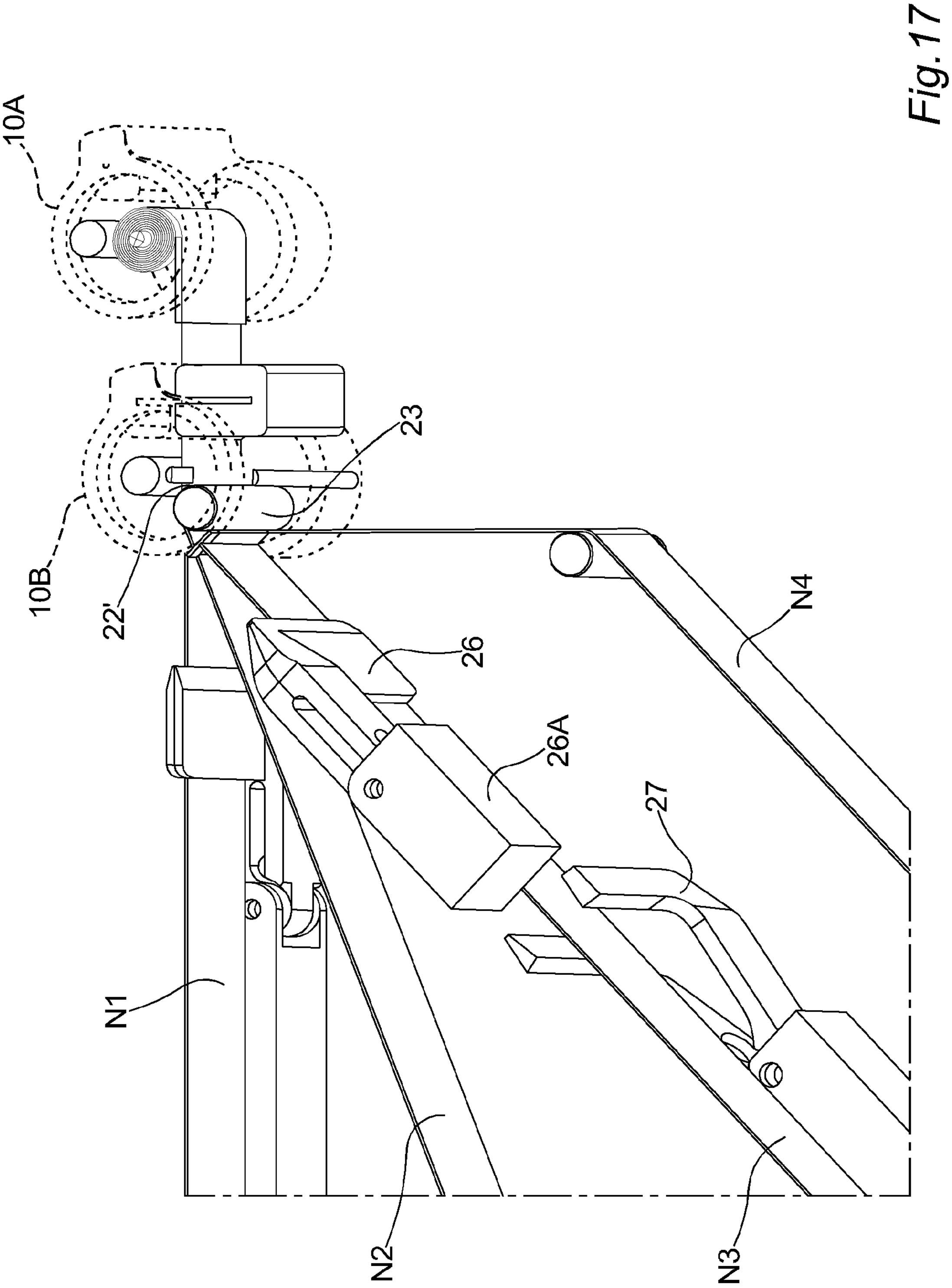

FIG. 11 is a schematic illustration showing two discordant directions according to the meaning of the present invention; and FIG. 12 illustrates an alternative embodiment of a movable portion of a feed unit of the apparatus according to the present invention, while it is moved to accumulate a quantity of strip, FIGS. 13 to 14 are schematic frontal views illustrating the apparatus according to the present invention during different operating steps, FIG. 15 is a schematic representation of the apparatus according to the present invention during different operating steps, FIG. 16 is a perspective view of the movable portion of the apparatus according to the present invention, FIG. 17 is a detail of the perspective view of the invention of FIG. 16.

Figure 2:
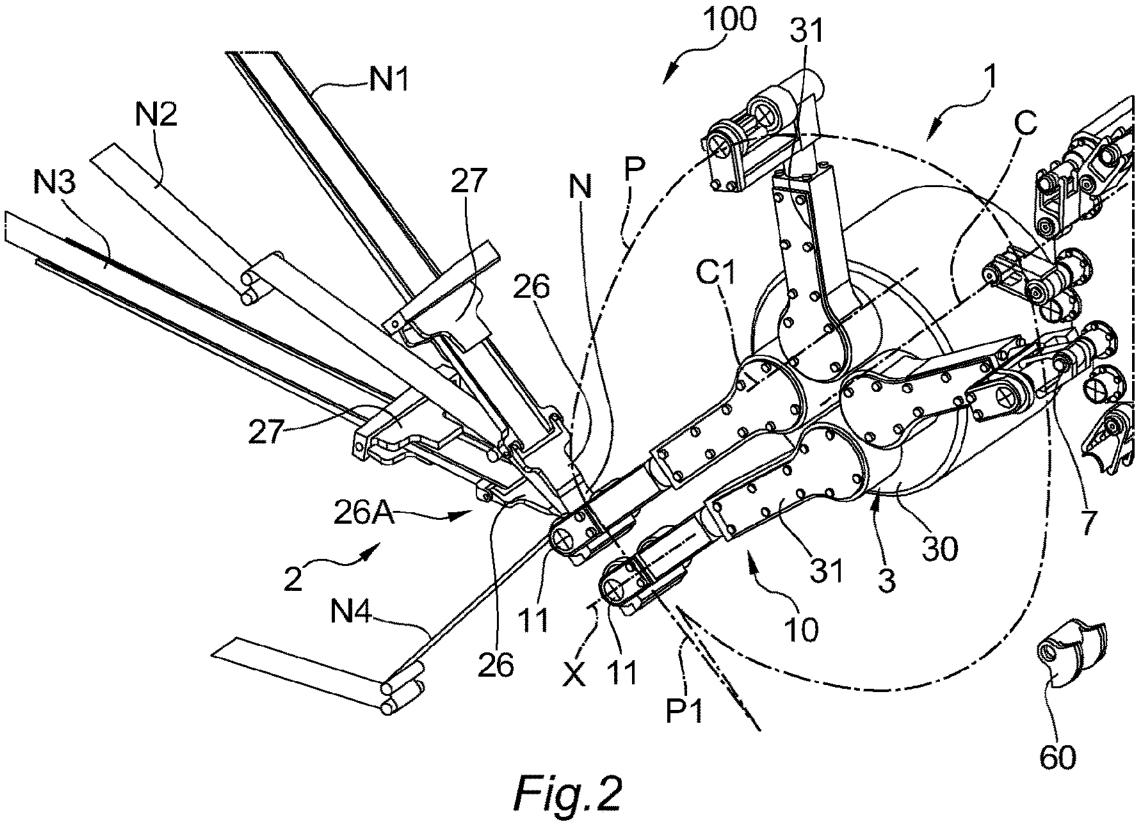
FIG. 2 is a perspective view of an apparatus made in accordance with the present invention.
Figure 1:
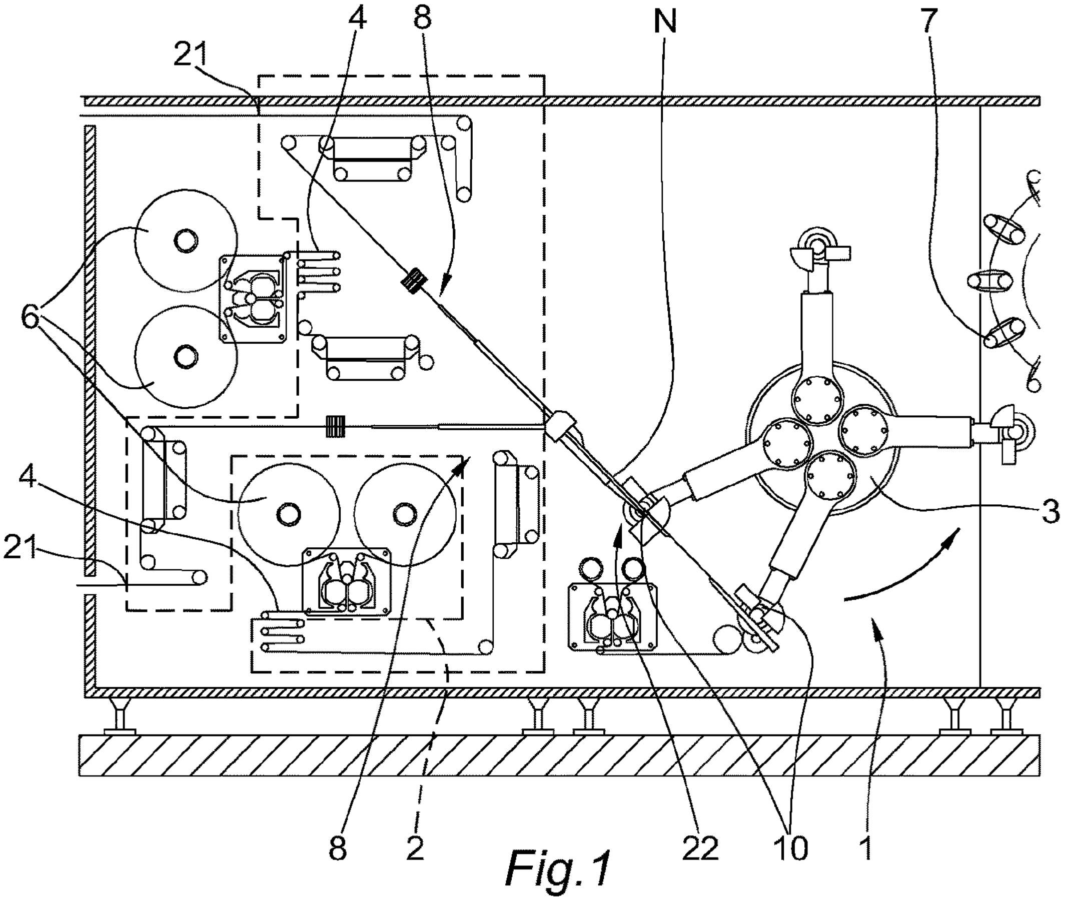
FIG. 1 is a schematic, frontal view of the apparatus according to the present invention.

With reference initially to FIGS. 1 and 2, an apparatus for making a coil B made in accordance with the present invention is indicated as a whole with 100.

In preferred embodiments, the apparatus 100 is intended to carry out the winding of a strip-shaped article N intended for the production of electrochemical cells.

However, it is understood that this represents a possible embodiment example and that the apparatus 100 according to the present invention may be intended for winding strip-shaped articles also intended for different uses, even in areas other than those related to the production of electrochemical cells.

For example, still in the field of energy storage, the present invention can find application in the production of other rolled components intended for batteries or supercapacitors.

In some embodiments, such as for example the one illustrated in FIG. 1, the apparatus 100 may be used within a line for the production of coils for electrochemical cells, in which the strip-shaped article N is made by a combination of multiple strips N1, N2, N3, N4, preferably overlapped into layers.

Such strips preferably comprise at least two conductor strips N1, N3 and two separator layers N2, N4, which are arranged alternated to form the strip-shaped article N.

In this way the separator strips N2, N4 can allow to keep the two conductor strips N1 and N3 electrically separated from each other as they are spirally wound, forming the coil intended for the electrochemical cell.

In preferred embodiments, the strips N1, N2, N3, N4 are supplied by special dispensing devices 6. By way of example, FIG. 1 illustrates an embodiment example of the dispensing devices 6 of the separator strips, which can be formed by large-sized coils in which the strip is collected so as to be unwound and then supplied during operation of the apparatus.

The strips supplied by the dispensing devices 6 are then supplied to a feed unit 2 which, in preferred embodiments, takes care of combining the strips between them in such a way as to form the strip-shaped article N before it is wound by a relative winding unit 1, the characteristics of which will be described in detail below.

Preferably, the feed unit 2 comprises an inlet section 21 preferably adapted to receive the strips from the respective dispensing devices 6 and an outlet section 22 through which said strip-shaped article N transits out of the feed unit 2 and is fed to the winding unit 1.

Between the inlet section 21 and the outlet section 22 a feed path 8 for the strips is thus defined. It will be appreciated that the strips, before being supplied to the feed unit 2, can transit through further units for example intended to carry out preliminary processing on the strips. For example, the conductor strips may be submitted to preliminary ablation operations to form a relative outer edge in order to favour the connections with the further conductor portions within the electrochemical cell.

As previously mentioned, the strips N1, N2, N3, N4 can be combined inside the feed unit 2 so as to form the strip-shaped article N to be wound for making the coil.

Figure 9:
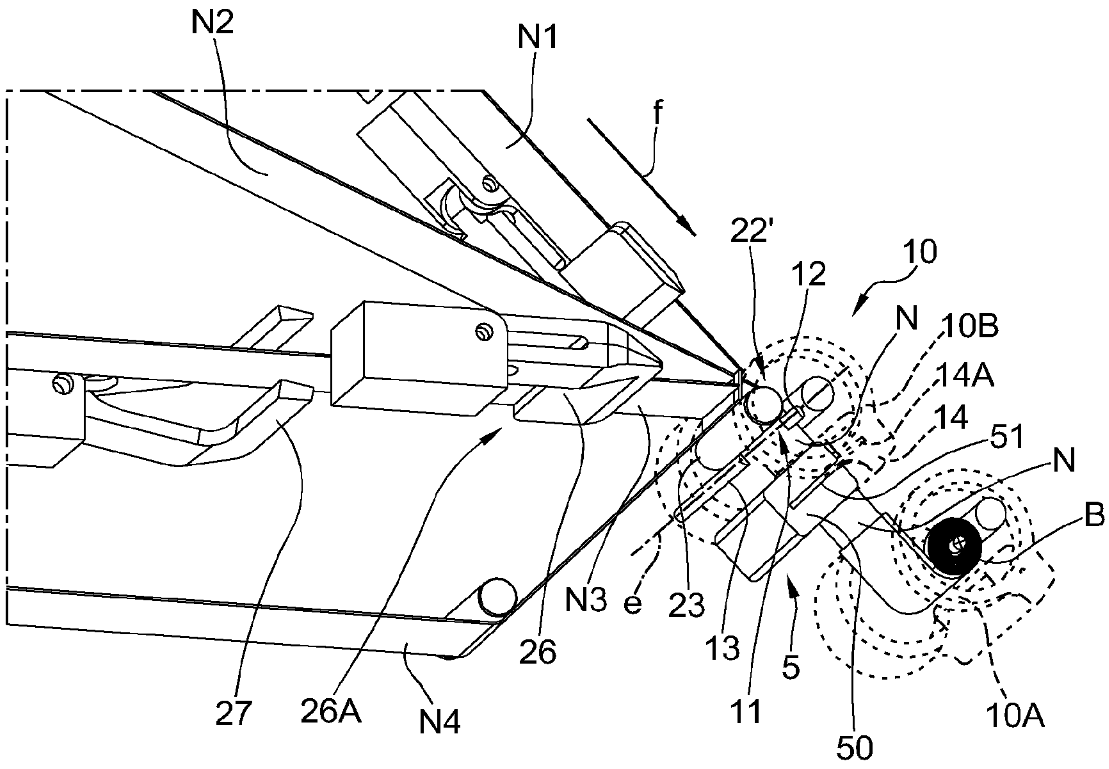
FIG. 9 is a further perspective view of the apparatus according to the present invention, with some components removed for illustrative clarity.

For this purpose, it can be provided that the strips N1, N2, N3, N4 are advanced along different directions to converge towards a coupling roller 23, visible in FIGS. 9 and 17, on which they are all partially wound in such a way that, downstream of said coupling roller 23, there is a single multilayer structure forming the strip-shaped article N.

In preferred embodiments the strips N1, N2, N3, N4 are fed continuously inside the feed unit 2. In other words, each strip, or possibly one or more of the aforesaid strips, is introduced into the feed unit 2 without ever stopping, proceeding with a speed greater than zero and preferably substantially constant.

However, there may be the need to provide for interruptions of one or more of the strips forming the strip-shaped article N or to slow down the advancement of one or more of the strips for other operational needs linked to the specific processing being carried out.

For example, while making coils intended for making electrochemical cells, it can be provided that the strips forming anode and cathode respectively are not present in the terminal portion of the strip-shaped article that is wound to form the coil. In other words, it can be provided that the coil has a terminal and/or initial flap in which only the two separator strips are present overlapped. For this and other purposes, it can be provided for the presence of an accumulation device 4, as shown for example in FIGS. 1, 3, 13 and 14, configured in such a way as to accumulate a quantity of at least one of said plurality of strips N1, N2, N3, N4 between the inlet section 21 and the outlet section 22 of the device.

With reference to FIGS. 13, 14 and 16, a feed zone ZA and a convergence zone ZC comprised in the operating space of the power unit 2 are respectively identified.

More in detail, for each strip of the plurality of strips N1, N2, N3, N4 the feed zone ZA is defined at least partially upstream of the movable portion 20, in which each strip of the plurality of strips N1, N2, N3, N4 moves along accumulation segments 81 substantially parallel to each other.

Furthermore, with particular reference for example to FIG. 16, the convergence zone ZC is comprised between the feed zone ZA and the coupling roller 23 and inside the movable portion 20, wherein the plurality of strips N1, N2, N3, N4 converges by reducing the mutual distances between each strip up to the coupling roller 23 making the strip-shaped article N.

Figure 3:
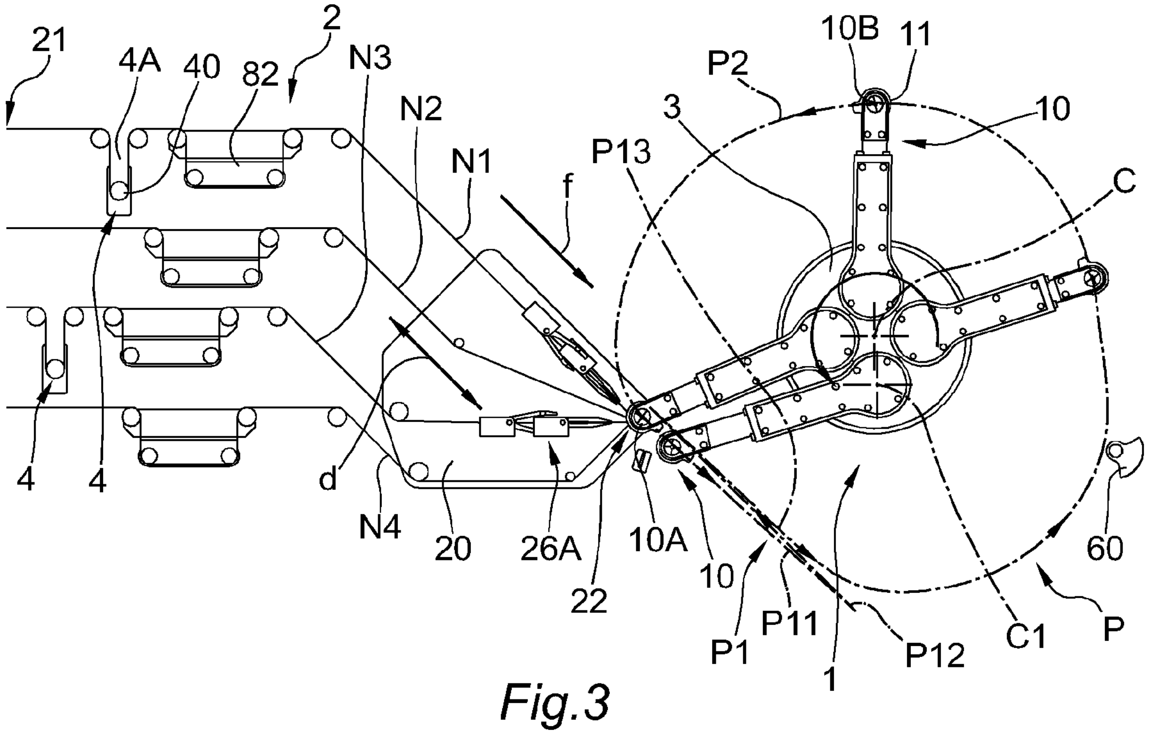
FIGS. 3 to 8 are schematic frontal views illustrating the apparatus according to the present invention during different operating steps.

As illustrated in the embodiment example of FIG. 3, in preferred embodiments the accumulation device 4 comprises at least one movable element 4A configured to vary an overall length of said feed path by movement of said movable element 4A.

The quantity of accumulated strip can be variable, in the sense that it can be envisaged that the quantity of strip, in terms of length, that is accumulated is variable during the different steps of the process, in order to meet specific needs as mentioned above.

For this purpose, a device for actuating the accumulation device 4 can be provided which actuates, preferably by displacing it, the accumulation device 4 to vary the accumulated quantity of strip. As illustrated in the example of FIG. 3, the movable element 4A may comprise at least one movable roller 40, on which the strip of which a certain quantity is to be accumulated is wound. The strip is then wound on the movable roller 40 and on at least one fixed roller. In this way, by varying the distance between the two rollers, the length of the path that the strip must travel between the inlet section 21 and the outlet section 22 can be varied, effectively allowing the desired quantity to be accumulated.

In this way, for example considering the example of FIG. 3, by lowering the movable roller 40 the length of the strip N1 can be increased and, considering a constant or substantially constant advancement speed at the inlet to the feed unit 2, the part of the strip at the outlet section can be slowed down or stopped with respect to the other strips.

It should also be noted that in preferred embodiments, the action of the movable roller 40, or more generally of the accumulation device 4, can be associated with a holding device 26A of the strip configured in such a way as to slow down or stop feeding one or more of the strips.

In other words, the action of the accumulation devices 4 can be coordinated with that of the holding device 26A, shown for example in FIGS. 16 and 17, in such a way that the accumulation device 2 accumulates the strip N when the holding device 26A slows down or stops the feeding of the strip.

For example, in some embodiments the presence of a gripper 26, illustrated for example in FIG. 2, or other similar holding element, acting on the strip at the time when it is required that this is stopped or slowed down may be provided in order to slow down the movement of such a part of strip.

The gripper 26 can advantageously be movable with respect to the movable portion, in such a way as to adjust the advancement speed of the relative strip by controlling its movement.

The gripper 26 can also be associated with a relative further cutting device 27 which, if necessary, performs the cut of one of the strips, to create an interruption in the continuity of said strip within the overall strip-shaped article N.

In preferred embodiments, the further cutting device 27 can occur by means of a knife or by means of another device such as for example a laser ablation system.

With reference to FIGS. 13 to 17, it can be noted that the movable portion 20 is preferably oriented horizontally and that a displacement direction thereof d and a feed direction f of the plurality of strips N1, N2, N3, N4 are also oriented horizontally. In this case, the holding device 26A, which acts in the convergence zone ZC, operates by holding at least one horizontally oriented strip.

In more detail, in FIG. 13 this horizontal strip is N1, while in FIG. 15 it is N3, which generally corresponds to a conductor, for example an anode or a cathode.

According to further embodiments, a lesser or greater number of strips than what is previously described is provided, making different combinations of types of materials used, thicknesses of the relative strips, etc.

With reference now to FIGS. 1 and 2, the winding unit 1 is arranged immediately downstream of the feed unit 2 so as to receive the strip-shaped article N formed by it.

Preferably, the strip-shaped article N is fed by being displaced along a feed direction f, which in preferred embodiments corresponds to the direction along which the strip-shaped article N moves once it is formed by combining the individual strips N1, N2, N3, N4 and possibly the direction that it assumes between the roller 23 and the winding unit 1.

In general, however, it will be possible to define an overall advancement direction of the strip-shaped article N as a function of the characteristics of the feed unit 2 and of the ways in which the strips are combined within it.

Preferably and with reference to FIGS. 13 and 14, the feed direction f comprises a horizontal segment. Still with reference to FIGS. 13 and 14, according to some embodiments of the present invention the horizontal segment of the feed direction f corresponds to accumulation segments 81 placed upstream of the movable portion 20 and described in more detail below.

Again with reference to FIGS. 2 and 3, in preferred embodiments, the winding unit 1 comprises a plurality of winding heads 10, each of which allows the strip-shaped article N to be wound according to manners described in greater detail below.

With reference to the embodiments illustrated in FIGS. 3 to 8 and 13 to 14, the movement device 3 and the movable portion 20 are kinematically independent. In fact, as can be immediately noted, displacements of the movable portion 20 do not directly induce specific movements of the movement device 3 and vice versa. The winding heads 10 are movable within a working path P, which is preferably closed, as schematically shown in FIG. 3.

The movement of the winding heads 10 is performed by means of a respective movement device 3 through which it is possible to have each head travel along the working path P.

Still with reference to FIGS. 3 to 8 and 13 to 14, it can be noted how the working path P has a common feature between the allowed movements of the movement device 3 and of the movable portion 20. In this common segment, it is to be understood that the movement device 3 and the movable portion 20 are configured to collaborate synergistically in order to make the coil B always remaining kinematically independent.

In more detail and with reference to FIGS. 13 and 14, it can be noted that the common segment of the working path P is horizontal and therefore in continuation of the displacement direction d according to some embodiments of the present invention.

In some embodiments, such as for example the one illustrated in FIGS. 2 and 13, the movement device 3 comprises a rotatable body 30 that can rotate about a rotation axis thereof C.

The rotatable body 30 supports a plurality of extendable arms 31, which are preferably hinged at one end thereof to the rotatable body 30 and, at an opposite end thereof, a respective winding head 10 is in turn supported.

Advantageously, the combination of the rotatable body 30 and of the extendable arms 31 allows the winding heads to perform the displacements that are necessary to follow the working path P. In preferred embodiments, this causes the winding heads 10 to move according to a trajectory which includes at least one rotation about the rotation axis C of the movement device 3 and a translation and/or a rotation about a further axis, different from said rotation axis C.

It can therefore be observed how, in the embodiments illustrated in the figures, the rotation about the further axis is performed through the oscillation of the arms 31 around the axis C1 passing through the end connected to the rotatable body 30.

However, it is evident that different combinations of such movements can also be envisaged which can be performed both simultaneously and one in succession to the other.

Figure 10:
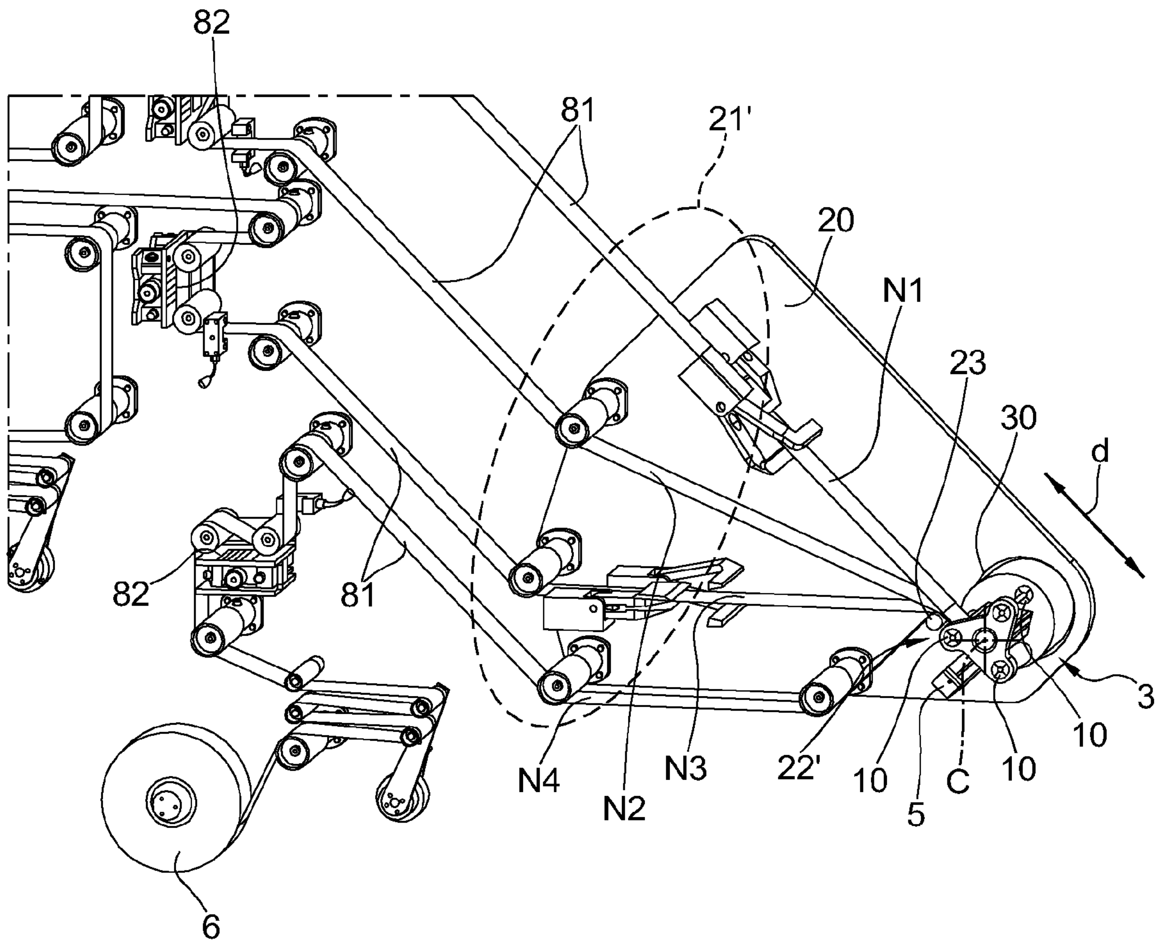
FIG. 10 is a schematic view according to a perspective view of an alternative embodiment of the apparatus according to the present invention.

FIGS. 10, 15 and 16 illustrates an embodiment variant of the present invention in which the winding heads 10 are directly fixed on the rotatable body 30, therefore without using the extendable arms.

Still with reference to FIGS. 10, 15 and 16 and according to alternative embodiments of the present invention, the rotatable body 30 of the movement device 3 is mounted with allowed rotation directly on the movable portion 20 at an area located downstream of the winding roller 23.

As can be clearly inferred from FIGS. 10, 15 and 16, in these embodiments the rotatable body 30 is not kinematically independent of the movable portion 20 since a component, for example translational, of the movable portion 20 would result in an equal translational component of the rotatable body 30 to which further relative own displacements could possibly be added.

In general, according to some embodiments, the rotatable body 30 can advantageously be further movable, in addition to around its rotation axis C, also along the displacement direction d, i.e. the direction along which said rotatable body 30 and, in general, the movement device 3, can be displaced.

Referring now again to FIG. 2, in some embodiments each winding head 10 supports a gripping device 11 that is configured to grasp a portion of said strip-shaped article N.

The winding of the strip-shaped article N can thus be obtained by rotation of the gripping devices 11 themselves around a winding axis thereof X. By grasping one end of the strip-shaped article N or, more generally, a portion thereof, and by rotating this end or portion, it is in fact possible to wind the strip-shaped article N obtaining a spiral configuration that forms the coil.

Referring now also to FIG. 9, each gripping device 11 preferably comprises a pair of pins 12, 13 between which the strip-shaped article N is held. In some embodiments, such as those illustrated in the figure, the pins 12, 13 have a semicircular section. However, it will be appreciated that other shapes may also be provided, for example any polygonal section, a cylindrical section, or even an overall shape of the flat pin.

At least one of the two pins is movable so as to be able to join the other pin holding said strip-shaped article N between them.

The pins 12, 13 are arranged substantially parallel to the winding axis X of the strip-shaped article and can also be rotated to perform the winding of the turns.

In order to allow the pins to grasp the strip-shaped article N, it may be provided that at least one of the two pins is movable along an extraction direction e. In this way, a first pin 12 of the pair can approach the strip-shaped article N during the movement of the relative head 10 along the path P. The second pin 13, which is movable, is instead intended to be arranged in a downstream position along the path P with respect to the fixed pin 12. In this way the strip-shaped article can be comprised between the two pins 12, 13.

For this purpose, the movement of the extraction direction e of the movable pin 13 is substantially parallel or more generally not perpendicular, with respect to the axis X and perpendicular, or more generally transverse, with respect to the feed direction f of said strip-shaped article N.

In this way, the second pin 13 can be placed in a position that does not interfere with the approach of the first pin 12 to the strip-shaped article N and it is possible to displace the second pin 13 to a position that holds the article N once the first pin 12 is positioned.

Advantageously also the first pin 12 can be configured in such a way as to move along the extraction direction e, simultaneously with the second pin 13, in order to allow discharging the coil, as will be illustrated in greater detail below.

FIGS. 3 to 8 illustrate the movement of the winding heads 10 and, in general, the operation of the present invention in a preferred embodiment.

Below these figures will be described in relation to two winding heads 10, it being evident that the same concepts will be applicable to an indefinite number of heads.

A first winding head 10A and a second winding head 10B, the latter one being arranged in an upstream position along the working path P with respect to the first head 10A, are therefore identified in FIG. 3.

In the condition of FIG. 3, the first winding head 10A is in a position adjacent to the outlet section 22 of the feed unit, in the position in which it receives the strip-shaped article N therefrom. The second winding head 10B is instead arranged along a reset segment P2 of the working path P. This reset segment P2 allows the path P to be closed, and is in particular the segment along which the winding heads return to the beginning of the operative segment P1 after having wound the strip-shaped article, formed the coil and discharged the latter in a discharge zone 7, the latter being schematically indicated in FIGS. 1 and 2. It will be appreciated that the coil B in this discharge zone 7 is discharged by the winding unit 1 to be transported to other units intended for making the cell.

Preferably the discharge takes place by moving the two pins 12, 13, which are displaced along the extraction direction in such a way as to free the coil B from the relative winding head.

After the strip-shaped article N has been grasped by the winding head 10A, it continues its movement along the working path at a first portion P11 of the operative segment P1.

Preferably said first portion P11 is rectilinear and is travelled in a manner concordant to the feed direction f of the strip-shaped article N.

In some embodiments, the feed unit 2 comprises a movable portion 20, which can be displaced along a displacement direction d and at which the outlet section 22 is formed and on which the coupling roller 23 is preferably fixed.

More in detail and with reference to FIGS. 13, 16 and 17, the movable portion 20 comprises a movable input section 21' from which the plurality of strips N1, N2, N3, N4 enters, a movable output section 22', from which said strip-shaped article N exits, a coupling roller 23 of the plurality of strips N1, N2, N3, N4 by means of which the strip-shaped article N is made and placed upstream with respect to the movable output section 22'.

Still with reference to FIGS. 16 and 17, it can be noted that the movable output section 22' is relative to the last step of displacement of the strip-shaped article N before it is wound into the coil by the winding head 10.

It is clear that in the embodiments according to the present invention in which the winding head 10 is mounted inside the movable portion 20, such as for example shown in FIG. 16, the movable output section 22' of the strip will also be internal to the movable portion 20. In embodiments according to the present invention and represented in FIGS. 13 and 14, for example, the displacement direction d of the movable portion 20 is substantially horizontal.

The movement of the movable portion 20 is carried out by means of motorized displacement devices not shown in the figures which preferably comprise tracks or slides, moved by means of belts or racks.

FIGS. 13, 14 and 15 show a movable portion 20 that moves in pure horizontal translation according to alternating rectilinear motion.

In further embodiments relating to the present invention, this alternating rectilinear advancement and backward movement on the same segment can be replaced with a slightly more complex law of motion comprising a first horizontal advancement segment, a second vertical displacement segment, a third horizontal backward segment (equal in modulus to the first horizontal advancement segment but in the opposite direction) and a fourth vertical displacement segment (equal in modulus to the second vertical displacement segment but in the opposite direction) and which allows the movable portion 20 to return to the initial starting point once the expected law of motion has been accomplished.

In alternative embodiments the displacement direction d forms an angle with respect to the horizontal direction comprised between 30° and 60° and is preferably equal to 45°.

Figure 4:
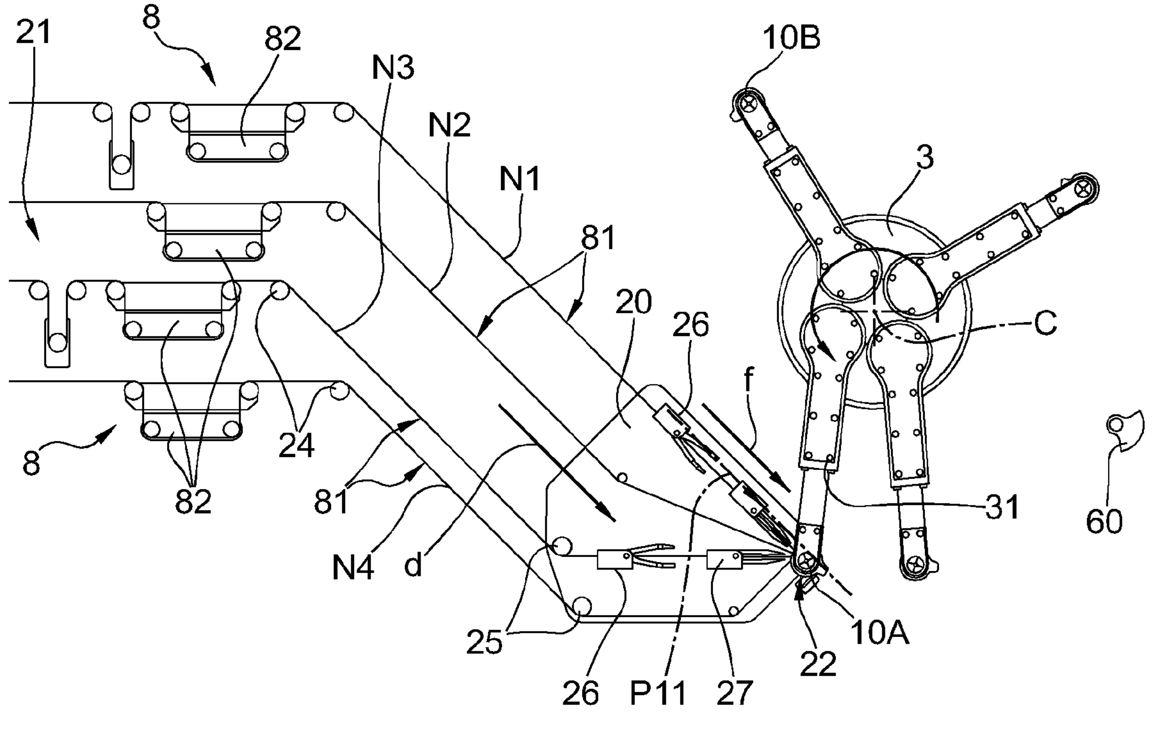

With reference to FIGS. 4, 13 and 16, preferably the feed paths 8 of the strips N1, N2, N3, N4 comprise a respective accumulation segment 81 with variable length which preferably extends between respective pairs of preferably idle diverter rollers 24, 25.

Preferably the accumulation segments 81 extend substantially parallel to each other and the direction of the strips N1, N2, N3, N4, is diverted by the diverter roller 25 so that each of the strips flows to the coupling roller 23.

Consistently with what has been previously described, the zone in which the strips N1, N2, N3, N4 downstream of the accumulation segments 81 deviate from the condition of relative parallelism and converge to the coupling roller 23 is defined as the convergence zone ZC.

In some embodiments, such as the one illustrated in figures from 1 to 10, 13, 14 16 3 17 and, in particular, in FIG. 4, the strip N1 is substantially parallel to the displacement direction d of the movable portion 20 and aligned with the coupling roller 23 and, consequently, the presence of the roller 25 is not necessary.

An alternative embodiment of the present invention is shown in FIG. 15 in which the strip N3 is substantially parallel to the displacement direction d of the movable portion 20 and substantially aligned with the coupling roller 23.

Advantageously, the distance between the substantially parallel accumulation segments 81 is such that it is possible to house the previously illustrated grippers 26 and knives 27 between two adjacent strips in the segment comprised between the diverter roller 25 and the coupling roller 23, or in any case in the aforesaid convergence zone.

In some embodiments one of the rollers of each pair of diverter rollers 24, 25 is supported on the movable portion 20, so as to move integrally with it, as will be illustrated in greater detail below. In this way the length of the accumulation segments 81 of each strip can be simultaneously varied by movement of the movable portion 20.

During the advancement of the movable portion 20 the feed unit 2 can therefore accumulate a quantity of strip-shaped article N between the inlet section 21 and the outlet section 22.

In fact, as can be observed from the comparison between FIGS. 3 and 4 and 13 and 14, the length of the accumulation segments 81 and, more generally, of the path that the strips N1, N2, N3, N4 travel between the inlet section 21 and the outlet section 22, is increased by coordinating the advancement of the strips with the displacement of the movable portion 20, effectively accumulating a quantity of the respective strips between these sections.

Preferably the displacement of the movable portion 20 is associated with the advancement of strips so as not to generate undesired tensions on them. The strips can in fact slide on the diverter rollers 25 while the movable portion 20 is being displaced thus increasing the length of the strip between the roller 24 and the roller 25, without inducing any undesired variations of tension. Preferably the displacement speed of the movable portion 20, if it is concordant to the advancement movement of the strips, will be lower than their feed speed.

In this way it is possible to avoid pulling the strip during the movement of the movable portion 20, thus making this displacement neutral with respect to the movement of the strips.

In preferred embodiments, the accumulation segments 81 extend substantially parallel to each other, remaining substantially parallel even during and following the displacement of the movable portion 20 and, consequently, their variation in length.

This can be achieved by providing that the movable portion 20 is displaced along a displacement direction d substantially parallel to the accumulation segments 81 as shown for example in FIGS. 13 and 14. In this way, when the movable portion is displaced along the direction d, the accumulation segments 81 increase or decrease their length by the same quantity.

More generally, the displacement direction d may preferably be substantially parallel to the feed direction f and both be substantially horizontal. As previously discussed, the feed direction f can be quite complex and therefore comprise a plurality of segments oriented differently between them among which there is at least a horizontal one.

It is interesting to note by comparing FIGS. 13 and 15 that for substantially equivalent displacement directions d, i.e. along the horizontal direction, it is always possible for the movable portion 20 to have a specific orientation thereof.

In fact, it can be noted that according to preferred embodiments the movement direction d corresponds to a pure rigid translation that does not change the relative orientation of the movable portion 20.

In more detail, it can be noted that in FIG. 13 the movable portion 20 has preferred substantially irregular pentagonal shape 20*a*, 20*b*, 20*c*, 20*d* 20*e* with a larger base 20*a* placed as a horizontal upper side. In this embodiment, the coupling roller 23 is placed near this larger base 20*a* and the strip N1 is substantially parallel to the displacement direction d of the movable portion 20 and aligned with the coupling roller 23.

Now, referring to FIG. 15, it can be noted that the movable portion 20 has preferred substantially irregular pentagonal shape 20*a*, 20*b*, 20*c*, 20*d* 20*e* with a larger base 20*a* placed as an inclined upper side with respect to the horizon by about 45° and a substantially horizontal lower base 20*d*. Also in this case, however, the displacement direction d according to pure translation results to be along the horizontal direction and thus all the parts of the movable portion 20 move integrally.

In this embodiment, the coupling roller 23 is placed near said lower base 20*d* and the strip N3 is substantially parallel to the displacement direction d of the movable portion 20 and aligned with the coupling roller 23.

Alternatively, the same result can be achieved by suitably arranging the rollers 24, 25 between which the accumulation segments 81 extend.

In particular, in specific embodiments, such as for example the one illustrated in FIG. 12, it can be provided that, unlike the embodiments illustrated in the other figures, both the rollers 24 and the rollers 25 are aligned to each other and aligned with the displacement direction d of the movable portion 20.

It can therefore be observed that the movement of the movable portion 20 is associated also in this case with a modification in the length of each of the accumulation segments 81.

In some embodiments, the feed unit 2 comprises, along the feed path 8, one or more alignment devices 82 configured in such a way as to guide the strips N in order to avoid, or in any case limit, transverse deviations thereof during their advancement. For example, the alignment devices 82 may comprise pivoting carriages which, if the strip undergoes a deviation in the transverse direction with respect to its advancement direction, urge the strip in such a way as to bring it back in a rectilinear condition.

Referring now again to FIG. 4, in some embodiments the movement of the winding head along the portion P11 may be accompanied by a corresponding movement of the movable portion 20 along the displacement direction d.

It should also be noted that the winding heads 10 and the movable portion 20 can be movable in a coordinated manner. In other words, the movement of the winding heads 10 and of the movable portion 20 takes place synchronously. As previously discussed, such a configuration is not necessarily outside a condition of kinematic independence between the winding heads 10 and the movable portion 20.

In this way, the distance between the winding head 10 that is winding or more generally holding the strip, and the movable portion 20 of the winding unit 2 can be controlled. Consequently, it will be advantageously possible to provide that the length of the strip-shaped article N comprised between the winding unit 2 and the winding head that is holding it, is minimal or in any case equal to a predetermined distance.

For example, it can be observed from FIG. 4 that also in this operating position the first head 10A is placed adjacent to the outlet section 22 of the feed unit 2.

For this purpose, in preferred embodiments, the displacement direction d can be substantially parallel to the first portion P11 of the operative segment P1.

It will be understood that, as previously mentioned, in the context of the present invention by the term "substantially" referred to the parallelism with respect to the operative segment P1 along which the winding takes place it is intended to mean that the two directions are parallel except for the deviations linked to the winding of the strip-shaped article N. In fact during the winding of the strip-shaped article N the position of the tangent point of the same on the coil being formed is variable and, unless it is compensated for by a movement of the extendable arms 31, it does not follow a perfectly rectilinear line. This can therefore lead to a deviation from a perfect parallelism. Therefore, as previously illustrated, the term "substantially parallel" will still indicate a possible deviation by ±10° and preferably ±5° with respect to a perfect parallelism.

Along the portion P11 the winding head 10 can also start winding the strip-shaped article N.

It will be appreciated that this is in particular linked to the ratio between the feed speed $v_f$ at which the strip-shaped article is fed by the feed unit 2 and the displacement speed $v_{sp}$ at which the winding heads move along the portion P11.

In fact, if the feed speed $v_f$ is higher than the displacement speed $v_{sp}$, in this portion it may be envisaged winding the strip-shaped article N at a winding speed such as to compensate for the difference between the two aforesaid speeds.

In this way the quantity of strip-shaped article N that is fed is either wound or accumulated as illustrated above. Consequently, the strip-shaped article N can be kept at a substantially constant tension by appropriately acting on the movement speeds of the head while it is winding and/or holding the strip-shaped article N.

It will be appreciated that the feed speed $v_f$ is preferably determined by the speed at which the dispensing coils that form the dispensing device 6 are rotated to unwind the strip, pushing, and then feeding, the strip in the feed unit 1 and subsequently in the winding unit 3. More generally, this speed can be determined by the mode of actuation of the dispensing device 6.

At the same time, also winding the strip-shaped article N through the winding heads 10 can contribute to determining the feed speed $v_f$, with a pulling action on each strip. At most, if the coils, or other dispensing device 6, are not motorized, and therefore are idle, the strip could be advanced only by the winding action.

The tension of the strip is also adjusted by the balance between the action of the dispensing device 6 and the winding of the strip-shaped article, in a manner conceptually similar to that illustrated in relation to the speeds.

Figure 5:
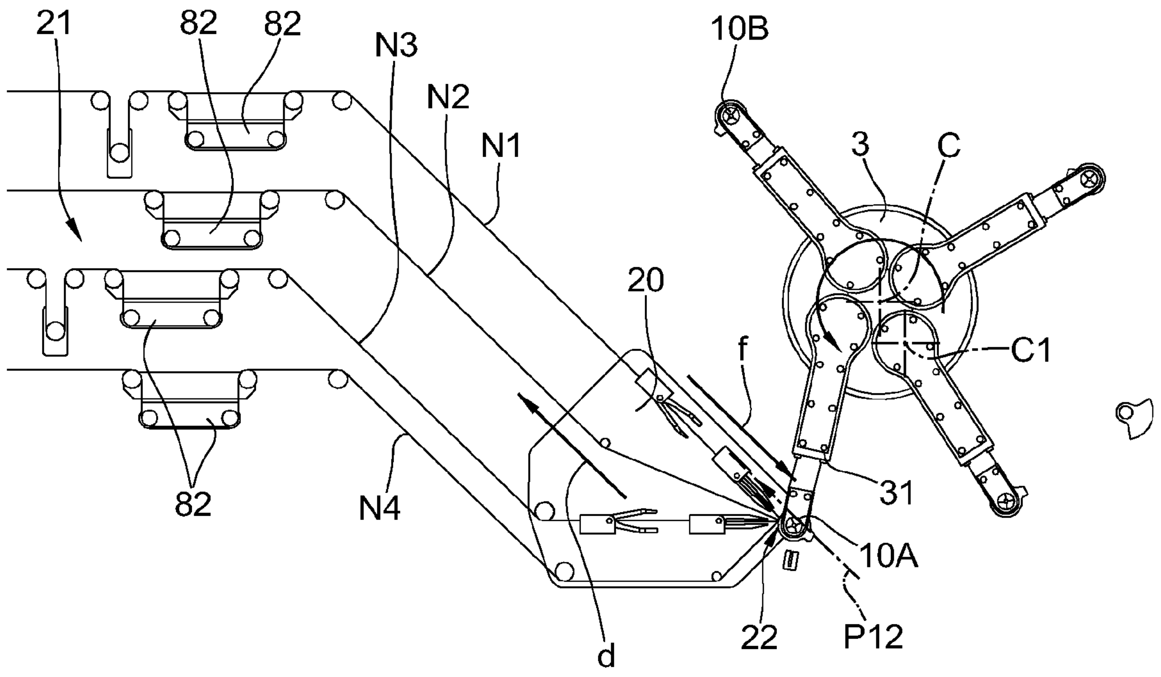

Referring now to FIG. 5, and in a similar manner in FIG. 14, once a displacement limit position is reached in a direction concordant with the feed direction f, the winding head 10A is displaced in the opposite direction along a second portion P12 of the operative segment P1.

This type of movement of the movable portion 20 is consistent with the previous description made of the motion as alternating rectilinear.

The argumentations set forth in relation to FIG. 5 et seq. where the displacement direction d is equal to about 45° apply similarly to the case where the displacement direction d is parallel to the horizon, like in the preferred case of the present invention.

The movement of the head 10A can be advantageously associated with a corresponding displacement of the movable portion 20 of the feed unit 2.

During the movement of the winding head 10A in the portion P12 the strip-shaped article N is wound through the head itself, preferably with a winding speed greater than that provided for the portion P11.

It will be appreciated that the displacement of the winding head 10 while performing such winding takes place in a direction discordant with respect to the feed direction f.

Also the relative portion P12 is preferably substantially parallel to the feed direction f and, optionally, to the displacement direction d.

Also in this case the same considerations set out above regarding the term "substantially parallel" apply.

The quantities of strips accumulated in the previous step can therefore be wound while the winding head 10A is moving along the portion P12.

Also in this step, equivalent considerations apply in relation to the feed speed and to the displacement speed of the head made with reference to the portion P11.

The feed speed $v_f$, the winding speed $v_{avv}$ and the displacement speed $v_{sp}$ will in fact preferably be such as to submit the strip-shaped article N to a substantially constant tension.

As previously illustrated, in preferred embodiments this can precisely be achieved by providing that the feed speed $v_f$ is substantially equal to the sum of said winding speed $v_{avv}$ and said displacement speed $v_{sp}$.

It will also be appreciated that advantageously the rotatable body 30 of the movement device 3 proceeds with its rotation motion in a continuous manner, while the arm 31 is rotated in the opposite direction, thus performing a movement that is contrary with respect to that carried out during the movement along the portion P11.

In other words, along the portion P11 and the portion P12 the arm 31 oscillates forwards and backwards so that the winding head can perform the previously described movement and the winding of the strip-shaped article.

Figure 6:
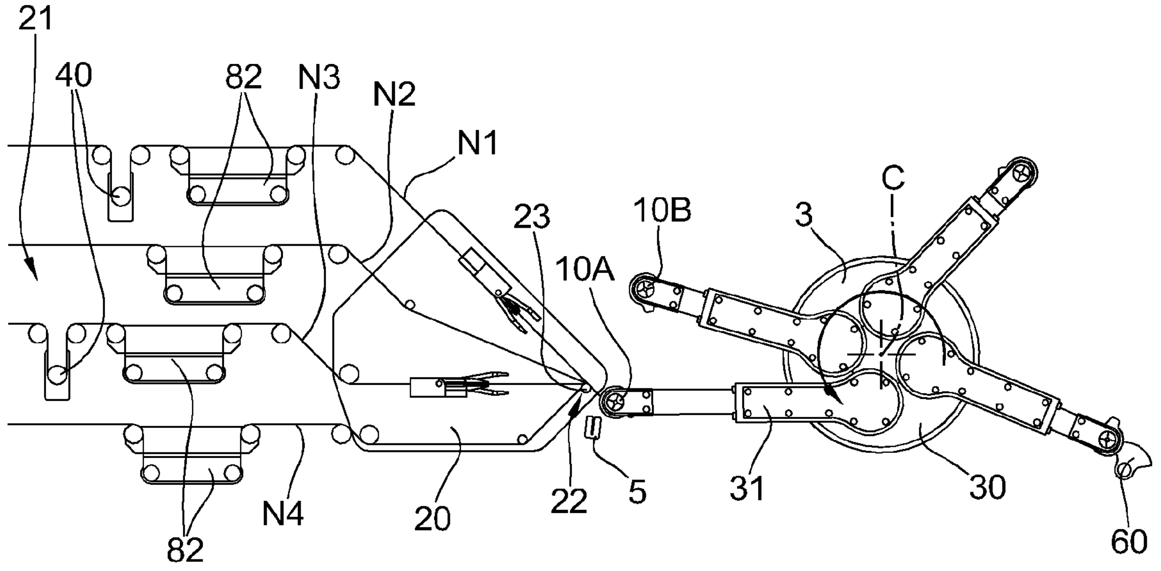

At a limit position along the segment P12, illustrated in FIG. 6, the first winding head 10A can be moved away with respect to the outlet section 22.

This movement can take place by movement of the head itself and/or displacement of the movable portion 20.

Figure 7:
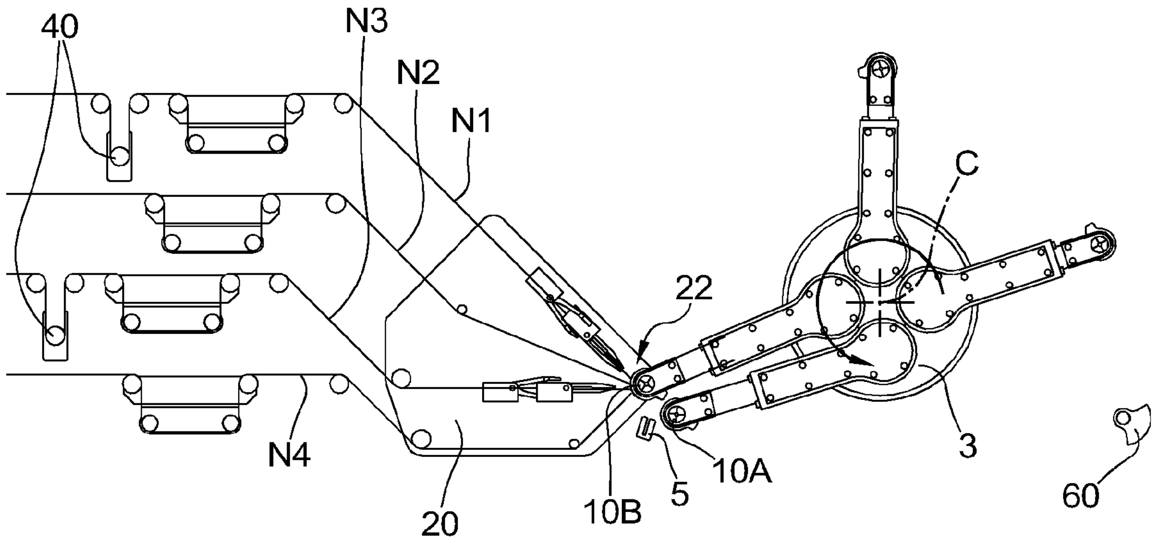

Thus, as visible in FIG. 7, a sufficient space may be provided so that a second winding head 10B, arranged upstream with respect to the first head 10A along the path P, can be interposed between the first winding head 10A and the outlet section 22.

In fact, it should be noted that in preferred embodiments it can be provided that the distance between the first winding head 10A and the second winding head 10B is variable along the working path P, as a function of the operating steps of the apparatus 100.

Thanks to this characteristic, it is possible to obtain the configuration illustrated by way of example in FIGS. 7 to 9 and 17, in which the two heads 10A and 10B are at a minimum distance such as to allow the positioning of a cutting element 51 of the cutting device 5 between them and the second head 10B is in turn at a predetermined distance, preferably substantially equal to the minimum distance from the movable portion 20 and, more generally, from the feed unit 2.

The two heads are furthermore preferably aligned along the feed direction f of the strip-shaped article N during the working segment in which the cut is made. It will in any case be appreciated that a perfect alignment along the feed direction f is not necessarily provided, it being sufficient that they are positioned at a close distance from each other and one more upstream than the other with respect to the outlet section 22 of the strip.

In this way, it is possible to grasp by means of the gripping device 11 of the second winding head 10B a relative portion of the strip-shaped article N, as can be observed from FIGS. 9 and 17 and according to what is described above.

The portion of strip-shaped article N can in particular be grasped according to what is illustrated above, by using the pair of pins 12, 13.

In this condition the strip-shaped article N is wound to form the coil B on the first winding head 10A and simultaneously grasped by the second winding head 10B.

In other words, the strip-shaped article N is simultaneously in the grip both on the first winding head 10A and on the second winding head 10B.

Moreover, again at this position it is possible to perform the cut of the strip-shaped article N at an intermediate position between the first winding head 10A and the second winding head 10B.

For this purpose, a cutting device 5 can be provided which is configured in such a way as to cut said strip-shaped article N at a position downstream of said feed unit 2 and, advantageously, in the aforesaid position.

In fact, as can be observed from the illustrated embodiment examples, the cutting device 5 advantageously cuts the strip-shaped article N, when the respective winding head 10 is positioned at said predetermined distance from said feed unit 2, advantageously substantially equal to the minimum distance compatible with the kinematic mechanisms that cause the movement of the winding heads 10.

As already illustrated, concurrently with the cut, the second winding head 10B is approached to the first winding head 10A, being advantageously at the minimum reciprocal distance along the working path P when the strip-shaped article N is cut.

The cutting device 5 is illustrated in a preferred embodiment thereof in FIGS. 9 and 17.

Preferably the cutting device 5 comprises a main body 50 which supports a cutting element 51.

In some embodiments the winding head 10 comprises an abutment element 14 placed in such a position that the strip-shaped article N is interposed between the abutment element 14 and the cutting device 5.

The abutment element 14 preferably has a seat 14A configured so as to receive the cutting element 51.

In this way, when the cutting device 5 is approached to the abutment element 14, the main body 50 of the cutting device 5 may abut the abutment element 14, with the strip-shaped article N interposed, and the cutting element 51 may be received in the seat 14A, generating a pressure on the strip-shaped article N sufficient to obtain the cutting thereof.

It should be noted that, according to embodiments of the present invention, upstream of the cutting operation of the strip-shaped article N it is provided that the conductor strips N1, N3 are interrupted and their advancement is stopped or slowed down by means of the gripper system 26 illustrated above.

Such embodiments are particularly advantageous in the case where the displacement direction d is horizontal since in that case there would be at least a portion of at least one strip N1, N3 constrained by means of the gripper system 26 which is oriented horizontally.

In this way the cut performed by the device 5 can only affect the separator strips N2, N4 which form the strip-shaped article N following the interruption of the conductor strips.

Figure 8:
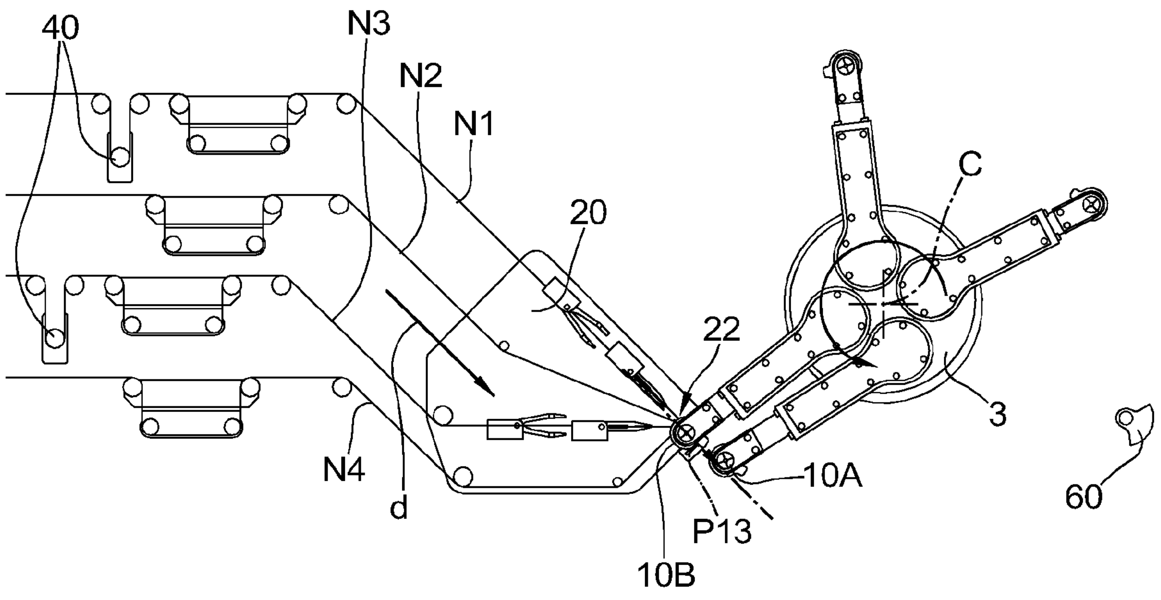

In particular, it can be noted by way of non-limiting example in FIGS. 7 and 8 the action of the grippers 26 on the conductor strips and the displacement of the movable rollers 40 with respect to the position of FIG. 6, in such a way as to accumulate the strip according to what has been previously illustrated.

In some embodiments the cutting device 5 is also movable in a direction substantially parallel to the feed direction f. In general it can be provided that the cutting device is movable with at least one component substantially parallel to this direction. For example, the cutting device 5 can be supported on the movable portion 20 or movable integrally therewith. In this way it will be possible both to approach the cutting device 5 to the abutment element 14, and to displace it in a synchronized manner to the strip-shaped article N. In other words, the cutting device 5 copies the movement of the strip-shaped article N, moving synchronously with it when performing the cutting operation.

Also thanks to such characteristics it is possible to envisage that the strip-shaped article N fed with feed speed $v_f$ is constantly greater than zero, and preferably substantially constant, it being possible for the cut to be performed while the strip-shaped article is also moving.

It should also be noted that the strips forming the strip-shaped article N can also be made to advance continuously inside the feed unit 2. In embodiments in which the interruption of the conductor strips, or of other strips forming the strip-shaped article, is provided, the continuous advancement will preferably be associated with the possibility of accumulating the strip. Instead, with regards to the strip or the strips for which no interruptions are envisaged, this/these can be made to advance continuously through the outlet section 22, in continuity with the strip-shaped article N.

Once the strip-shaped article N has been cut, two flaps remain defined, one associated with the first winding head 10A that forms the terminal part of the coil wound therein, and one associated with the second winding head 10B that forms the initial part of the coil B that will be subsequently wound.

Preferably, the process for making the coil B provides for a third portion P13 of the operative segment P1, preferably substantially parallel to said first and second portion P11, P12 and along which the winding head 10A is displaced after cutting the strip-shaped article N.

In preferred embodiments, the winding head moves again in a direction concordant to said feed direction f along said third portion P13.

Preferably said movement device 3 is configured in such a way that when the first winding head 10A travels along said third portion P13, the second winding head 10, which has advantageously just grasped the strip-shaped article N, travels along the first portion P11 performing, in sequence, the steps described above in relation to the first winding head 10A.

Along the portion P13, on the other hand, the first winding head completes the winding of the flap of the strip-shaped article N which was created after the cut, ending to make the coil B.

As previously illustrated, the winding of the strip-shaped article N to make the coil B can take place in each of the three portions P11, P12, P13.

Preferably, the winding takes place mainly, i.e. for a greater percentage quantity, along the second portion P12.

However, the winding may take place partially also in the other portions.

In fact, in preferred embodiments, the winding of the strip takes place for a quantity comprised between 5% and 15%, preferably 10%, of the overall length of the strip-shaped article forming a single coil along the first portion P11, for a quantity comprised between 70% and 90%, preferably 80%, along the second portion P12 and for a quantity comprised between 5% and 15%, preferably 10%, along the third portion P13.

The displacement of the first winding head 10A then continues until it arrives at the discharge zone 7, where the coil B is discharged from the winding unit 1.

In some embodiments, the apparatus 100 can comprise further working units 60 at which the winding head 10 passes through with the coil B before arriving at the discharge zone 7.

By way of example, the further working unit 60 can comprise a folding device configured to fold the two opposite axial ends of the coil. It can in fact be provided that the conductor strips each protrude axially, the one on one side and the other on the other, and are folded in such a way as to form a single conductor portion intended to be connected to an anode/cathode end in the cell once it is assembled.

In some embodiments, the application of a closing element of the coil B can also be provided, which closing element is configured in such a way as to prevent it from unwinding once it is discharged from the winding head 10. Such a closing element may for example be represented by a strip applied circumferentially to the coil in order to close the terminal flap of the strip-shaped element.

After having discharged the coil, the winding head 10A starts passing through along the reset segment P2 in order to be displaced from a discharge position to a gripping position in which the winding head 10 can grasp the portion of the strip-shaped article N as previously illustrated.

The steps described above can therefore be repeated cyclically for each of the included winding heads 10 of the winding unit 1.

As mentioned above, FIG. 10 illustrates a possible illustrative variant of the apparatus according to the present invention.

In this variant it is provided that the movement device 3 moves integrally with the movable portion 20 of the winding unit 2.

For this purpose, the movement device 3 can be rotatably supported around the rotation axis C on the movable portion 20.

In the embodiments in which the movement device 3 can move as a whole, like in the illustrated example in which it moves along the displacement direction d, it can therefore be provided that the winding heads 10 remain in a substantially fixed position with respect to the rotating body 3 and that, consequently, their mutual distance remains unchanged.

In other words, the movement heads 10 may in this case be displaced, in addition to rotating on themselves for winding the strip-shaped article N, also following the movement of the rotating body of the movement device 3, preferably the linear displacement thereof. In the embodiment illustrated in FIG. 10, as well as more generally others in preferred embodiments not illustrated, such movement includes both the rotation about the axis C, and the translation along the displacement direction d.

However, it will be appreciated that, more generally, the movement of the movement heads 10 can in this case be caused by any rotation and any translation or further rotation, always in addition to the rotation made to wind the strip-shaped article N.

However, these movements do not cause a variation in the mutual distance between the winding heads 10.

However, a combination may be provided between this embodiment and those previously described wherein the distance of the heads is variable.

More generally, all the elements described so far in relation to the embodiment illustrated in FIG. 10 may be combined with all the possible embodiments provided for by the present invention and described above.

It goes without saying that, in order to meet specific and contingent application needs, a person skilled in the art will be able to make further modifications and variants that are nevertheless within the scope of protection as defined by the following claims.

The invention claimed is:

1. An apparatus for making a coil for an electrochemical cell intended for battery production, said apparatus comprising:

A feed unit configured to feed a plurality of strips suitable for making at least one strip-shaped article, said plurality of strips comprising at least one conductor strip and/or one separator strip;

A winding unit which includes:

at least one winding head;

said at least one winding head being configured to wind said strip-shaped article so as to make said coil, said feed unit comprising a movable portion, comprising a movable inlet section from which said plurality of strips enters, a movable outlet section from which said strip-shaped article exits, a coupling roller of said plurality of strips by means of which said strip-shaped article is made and placed upstream with respect to said movable outlet section, said movable portion being configured to be displaced along a substantially horizontal displacement direction.

2. The apparatus according to claim 1, wherein said movable portion moves according to a translation by performing an alternating rectilinear movement.

3. The apparatus according to claim 1, wherein said winding unit comprises a movement device of said at least one winding head configured to displace said at least one winding head along a working path;

said winding head being movable along said working path so that said at least one strip-shaped article is submitted to a substantially constant tension during the winding of said strip-shaped article by means of a respective winding head and as a consequence of the movement of said winding head at least in a segment comprised between said feed unit and said at least one winding head.

4. The apparatus according to claim 3, wherein said movement device and said at least one winding head are kinematically independent with respect to said movable portion.

5. The apparatus according to claim 3, wherein said movement device of said at least one winding head is directly constrained to said movable portion downstream of said coupling roller.

6. The apparatus according to claim 5, wherein said movement device comprises a rotatable body configured to rotate about a rotation axis thereof and said at least one winding head being directly constrained on said rotatable body with allowed rotation about a winding axis substantially parallel to said rotation axis.

7. The apparatus according to claim 3, wherein said movement device comprises a rotatable body configured to rotate about a rotation axis thereof, said movement device comprising a plurality of arms constrained to said rotatable body and hinged at one end thereof to said rotatable body with allowed rotation about a second rotation axis substantially parallel to said rotation axis and wherein, at an opposite end thereof, a respective winding head is hinged according to a winding axis thereof that is substantially parallel to said rotation axis.

8. An apparatus according to claim 1 wherein said feed unit is configured so as to define a feed zone for each strip of said plurality of strips defined at least partially upstream of said movable portion, wherein each strip of said plurality of strips moves along accumulation segments substantially parallel to each other, and a convergence zone, comprised between said feed zone and said coupling roller and internal to said movable portion, wherein said plurality of strips converges by reducing the mutual distances between each strip up to said coupling roller making said strip-shaped article.

9. The apparatus according to claim 8, wherein a strip of said plurality of strips is fed according to a direction substantially parallel to the displacement direction of said movable portion in said convergence zone.

10. The apparatus according to claim 9, wherein said one strip of said plurality of strips is fed according to a direction substantially parallel to the displacement direction also at a portion of said feed zone.

11. The apparatus according to claim 10, wherein said strip fed according to said direction substantially parallel to the displacement direction also at said portion of said feed zone is a conductor.

12. A method for making a coil for an electrochemical cell intended for battery production, said coil being made by winding a strip-shaped article, said method comprising:

Arranging a feed unit comprising a movable portion to feed a plurality of strips, to a coupling roller by means of which said strip-shaped article is made;

providing at least one winding head;

winding said strip-shaped article exiting said coupling roller by means of said at least one winding head; and moving said movable portion along a substantially horizontal displacement direction.

13. The method according to claim 12, wherein said at least one winding head is movable along a working path and comprising moving said at least one winding head such that said strip-shaped article is submitted to a substantially constant tension.

14. The method according to claim 12, wherein said feed unit is configured such that it can move each strip of said plurality of strips along respective accumulation segments substantially parallel to each other in a portion of feed zone defined at least partially upstream of said movable portion, and make said plurality of strips converge into a convergence zone, comprised between said feed zone and said coupling roller and internal to said movable portion, by reducing the mutual distances between each strip of said plurality of strips up to said coupling roller making said strip-shaped article.

15. The method according to claim 14, comprising feeding a strip of said plurality of strips according to a direction substantially parallel to said displacement direction of said movable portion at said convergence zone.

16. The method according to claim 15, comprising feeding said one strip of said plurality of strips in a direction substantially parallel to the displacement direction (d) also at a portion of said feed zone.

17. The method according to claim 16, wherein said strip fed according to said direction substantially parallel to the displacement direction also at said portion of said feed zone is a conductor.

* * * * *